(12) United States Patent
Wunderlich et al.

US011146675B1

(10) Patent No.: US 11,146,675 B1
(45) Date of Patent: Oct. 12, 2021

(54) SYSTEM AND USER INTERFACE HAVING PUSH-TO-TALK, OUTBOUND DIALER, AND MESSAGING FUNCTIONS WITH RECIPIENTS IDENTIFIED USING A PROXY ALIAS

(71) Applicant: State Farm Mutual Automobile Insurance Company, Bloomington, IL (US)

(72) Inventors: Linda Wunderlich, Buford, GA (US); Andrew J. Watt, Roswell, GA (US); Cesar Bryan Acosta, Atlanta, GA (US); Mercy St James, Flowery Branch, GA (US); Christopher Chickoree, Atlanta, GA (US); Emre Ozgener, Atlanta, GA (US); Alexander Ralph Schneck, Roswell, GA (US); Tobiah Rothlingshofer, Gainesville, GA (US); Steven Stiles, Sandy Springs, GA (US); Garrett Bernard Williams, Snellville, GA (US); Julian Loreti, Brookhaven, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/278,532

(22) Filed: Feb. 18, 2019

(51) Int. Cl.
*H04M 3/42* (2006.01)
*H04M 1/72469* (2021.01)
(Continued)

(52) U.S. Cl.
CPC ........ *H04M 1/72469* (2021.01); *H04L 51/28* (2013.01); *H04L 67/28* (2013.01);
(Continued)

(58) Field of Classification Search
CPC ....... H04M 3/42; H04M 3/42314; H04M 3/56
See application file for complete search history.

(56) References Cited

U.S. PATENT DOCUMENTS 7,526,306 B2    4/2009  Brems et al.
8,218,736 B1 *  7/2012  McClintock .......... H04M 1/642
                                                379/88.12
(Continued)

*Primary Examiner* — Rafael Pérez-Gutiérrez
*Assistant Examiner* — Xiang Zhang
(74) *Attorney, Agent, or Firm* — Armstrong Teasdale LLP

(57) ABSTRACT

An enterprise communication computing device enabling communication with recipient computing devices based upon unique, non-telephonic-based recipient computing device identifiers associated with recipient computing devices may be provided. The communication device may include a processor and a memory device and a communication interface. The communication interface may include a plurality of modules including telephonic communication, text-based messaging, and two-way radio communication. The processor may be programmed to generate a user interface with a plurality of icons, each representative of a module. The processor may receive a selection of a first icon representative of a first module, and may execute the first module. The processor may receive user input defining a message, including user identifiers identifying intended recipients, transmit, to a remote data source, a query including the identifiers, and receive recipient computing device identifiers including unique non-telephonic-based identifiers. The processor may transmit the message to each recipient computing device based upon the identifiers.

18 Claims, 15 Drawing Sheets

(51) Int. Cl.
*H04M 7/00* (2006.01)
*H04W 4/10* (2009.01)
*H04L 12/58* (2006.01)
*H04L 29/08* (2006.01)
*H04W 4/12* (2009.01)
*H04M 1/72436* (2021.01)
*G06F 3/0481* (2013.01)

(52) U.S. Cl.
CPC ..... *H04M 1/72436* (2021.01); *H04M 7/0042* (2013.01); *H04W 4/10* (2013.01); *H04W 4/12* (2013.01); *G06F 3/04817* (2013.01)

(56) References Cited

U.S. PATENT DOCUMENTS

| | | | |
|---|---|---|---|
| 8,538,779 | B1 | 9/2013 | Whibbs et al. |
| 8,589,513 | B1 | 11/2013 | Tamer et al. |
| 8,924,593 | B2 | 12/2014 | Ranney |
| 9,203,873 | B2* | 12/2015 | den Hartog ....... H04W 28/0268 |
| 9,225,537 | B1* | 12/2015 | Hendricks .......... H04L 12/1813 |
| 9,408,077 | B1* | 8/2016 | David .................... H04W 4/14 |
| 10,243,893 | B2 | 3/2019 | Park |
| 10,320,732 | B2 | 6/2019 | Park et al. |
| 10,848,445 | B1 | 11/2020 | Willmann |
| 2002/0099777 | A1 | 7/2002 | Gupta et al. |
| 2002/0188527 | A1 | 12/2002 | Dillard et al. |
| 2004/0015547 | A1 | 1/2004 | Griffin et al. |
| 2004/0224710 | A1* | 11/2004 | Koskelainen ......... H04M 15/00 455/518 |
| 2004/0237051 | A1 | 11/2004 | Clauson |
| 2004/0249890 | A1 | 12/2004 | Fellenstein et al. |
| 2005/0030977 | A1 | 2/2005 | Casey et al. |
| 2005/0143135 | A1* | 6/2005 | Brems ................ H04M 1/2745 455/564 |
| 2005/0262208 | A1 | 11/2005 | Haviv et al. |
| 2006/0053279 | A1 | 3/2006 | Coueignoux |
| 2006/0058012 | A1* | 3/2006 | Caspi ................ H04L 65/4061 455/415 |
| 2006/0120516 | A1 | 6/2006 | Armbruster et al. |
| 2006/0168038 | A1* | 7/2006 | Lin .................... H04L 29/1215 709/206 |
| 2006/0178138 | A1* | 8/2006 | Ostroff ................. H04W 76/45 455/426.1 |
| 2007/0259678 | A1* | 11/2007 | Kuk .................. H04M 1/72525 455/466 |
| 2008/0018928 | A1 | 1/2008 | Meziani et al. |
| 2008/0056463 | A1* | 3/2008 | Lahtiranta ........... H04M 1/7255 379/88.18 |
| 2008/0147804 | A1 | 6/2008 | Gyure et al. |
| 2009/0182830 | A1 | 7/2009 | Goldman et al. |
| 2009/0197575 | A1* | 8/2009 | Degraeve ............ H04L 29/1216 455/412.1 |
| 2009/0228806 | A1 | 9/2009 | Kadashevich et al. |
| 2009/0233596 | A1* | 9/2009 | Calabrese ............... H04W 4/18 455/426.1 |
| 2009/0287920 | A1* | 11/2009 | Fernandez ............. H04L 63/16 713/151 |
| 2010/0048235 | A1* | 2/2010 | Dai .................... H04L 65/4061 455/518 |
| 2010/0285775 | A1 | 11/2010 | Klein et al. |
| 2011/0188456 | A1 | 8/2011 | Rawat et al. |
| 2011/0206189 | A1* | 8/2011 | Kennedy ............. H04M 11/066 379/52 |
| 2012/0034897 | A1 | 2/2012 | Kreitzer et al. |
| 2012/0036552 | A1 | 2/2012 | Dare et al. |
| 2012/0143964 | A1 | 6/2012 | DeLuca et al. |
| 2012/0148034 | A1 | 6/2012 | Ferguson |
| 2013/0023247 | A1 | 1/2013 | Bolon et al. |
| 2013/0097526 | A1 | 4/2013 | Stovicek et al. |
| 2013/0102287 | A1* | 4/2013 | Toksvig .................. H04W 4/90 455/414.1 |
| 2013/0157699 | A1* | 6/2013 | Talwar .................... H04L 51/38 455/466 |
| 2013/0288754 | A1* | 10/2013 | Osanai ............. H04M 1/72519 455/566 |
| 2013/0316679 | A1* | 11/2013 | Miller ............... H04M 1/72519 455/412.1 |
| 2014/0128041 | A1* | 5/2014 | Horn ....................... H04W 4/60 455/414.1 |
| 2014/0280651 | A1 | 9/2014 | Krugman et al. |
| 2014/0289644 | A1 | 9/2014 | Clarke et al. |
| 2015/0020011 | A1 | 1/2015 | Roberts et al. |
| 2015/0163066 | A1* | 6/2015 | DeRosa .............. H04L 12/1818 370/250 |
| 2015/0207766 | A1 | 7/2015 | Lindner et al. |
| 2015/0312180 | A1 | 10/2015 | Taler |
| 2015/0331997 | A1 | 11/2015 | Joao |
| 2015/0382166 | A1* | 12/2015 | Ferraz .................... H04L 51/10 455/414.4 |
| 2016/0014066 | A1 | 1/2016 | Goto et al. |
| 2016/0239165 | A1 | 8/2016 | Chen et al. |
| 2016/0316066 | A1* | 10/2016 | Charugundla ...... H04M 7/0039 |
| 2016/0342571 | A1 | 11/2016 | Lane et al. |
| 2017/0075515 | A1 | 3/2017 | Ramakrishna et al. |
| 2017/0075518 | A1 | 3/2017 | Ramakrishna et al. |
| 2017/0078212 | A1 | 3/2017 | Faruk et al. |
| 2017/0099589 | A1 | 4/2017 | Klein et al. |
| 2017/0353410 | A1 | 12/2017 | Gonzales |
| 2017/0374528 | A1 | 12/2017 | Bolon et al. |
| 2018/0115504 | A1 | 4/2018 | Everton |
| 2018/0219818 | A1 | 8/2018 | Kramer et al. |
| 2018/0241871 | A1 | 8/2018 | Sarafa et al. |
| 2018/0288212 | A1 | 10/2018 | Klein et al. |
| 2018/0375877 | A1 | 12/2018 | Jakobsson et al. |
| 2019/0164154 | A1 | 5/2019 | Greenberger |
| 2019/0238488 | A1 | 8/2019 | Peng et al. |
| 2019/0273707 | A1 | 9/2019 | Deac |
| 2019/0297034 | A1 | 9/2019 | Gupta et al. |

* cited by examiner

SYSTEM AND USER INTERFACE HAVING PUSH-TO-TALK, OUTBOUND DIALER, AND MESSAGING FUNCTIONS WITH RECIPIENTS IDENTIFIED USING A PROXY ALIAS

FIELD OF THE INVENTION

The present disclosure relates to unified multi-function enterprise communication systems, and, more specifically, to network-based systems and methods for single point-of-entry communication command and control for communication broadcasting, propagation, and response based upon user and group aliases.

BACKGROUND

In large communities or enterprise environments, the dissemination of information to individuals or groups of individuals may require maintaining or periodically updating contact information. Contact information for designated recipients in some cases may be outdated. In some cases, such as in emergency and/or disaster relief situations, multiple channels of communication may be needed to ensure that important messages, such as, for example, emergency alert messages, are received by a large number of individuals in a timely and secure manner. In addition, maintaining and transmitting private contact information may require heightened security measures to maintain privacy. In some cases, the communication may require conformance with regulatory requirements such as the Telephone Consumer Protection Act. For example, individuals who do not wish to receive alerts (e.g., have opted out of alerts) may need to be proactively excluded from receiving any communication.

In cases where mass groups of individuals need to be notified, determining which individuals need to be contacted may require acquiring information from multiple sources. In some cases, manual operation of a mass notification system may be required. For some known mass notification systems, a notification message (e.g., alert) may require manual input of each recipient's contact information. Some mass notification systems may be limited to unidirectional messages of limited content. These mass notification systems may not allow recipients to respond, thereby requiring the recipient to use alternate methods to initiate a response. Accordingly, there exists a need for a communication system that enables bilateral communication, in real time, with mass groups of individuals without compromising the security of each individual's contact information.

BRIEF SUMMARY

The present embodiments may relate to systems and methods for providing multi-function enterprise communications using user and group aliases. In one embodiment, the enterprise communication system uses an enterprise communication computing device to communicate with recipient computing devices based upon a unique, non-telephonic-based recipient computing device identifier associated with each recipient computing device.

In one aspect, the enterprise communication ("EC") computing device may include a processor in communication with a memory device and a communication interface. The communication interface includes a plurality of modules including a telephonic communication module for cellular telephonic communication with remote computing devices. The communication interface also includes a text-based messaging module for cellular text-based communication with remote computing devices. The communication interface further includes a two-way radio communication module for two-way push-to-talk (PTT) communication with remote computing devices.

The EC processor may be programmed to (i) generate a user interface for execution on the enterprise communication computing device, the user interface including a display with a plurality of icons, each icon representative of a corresponding module of the plurality of modules, (ii) receive, from within the user interface executed on the enterprise communication computing device, a user selection of a first icon of the plurality of icons, the first icon representative of a first module of the plurality of modules, (iii) execute the first module represented by the selected first icon, (iv) receive user input defining a message to be sent using the first module and including one or more user identifiers identifying a respective one or more intended recipients of the message to be sent, (v) transmit, to a remote data source, a query including the one or more user identifiers, (vi) receive, from the remote data source, one or more recipient computing device identifiers of a respective one or more recipient computing devices, each recipient computing device associated with a respective one of the intended recipients of the message to be sent, wherein each recipient identifier includes a unique non-telephonic-based identifier associated with the respective recipient computing device, and (vii) transmit, via the first module, the message to each recipient computing device identified based upon the received recipient computing device identifiers. The EC computing device may be configured to include additional, less, or alternate functionality, including that discussed elsewhere herein.

In another aspect, a method of enabling communication between an enterprise communication computing device and recipient computing devices based upon a unique, non-telephonic-based recipient computing device identifier associated with each recipient computing device may be provided. The method may be implemented using a centralized server computing device.

The method may include (i) storing, in a central data source, a data structure associating a plurality of user identifiers with a plurality of user computing devices and associating each user computing device with a respective unique non-telephonic-based device identifier that uniquely identifies the associated recipient computing device, (ii) uploading, to an enterprise communication computing device, an enterprise communication application, wherein execution of the enterprise communication application on the enterprise communication computing device causes the enterprise communication computing device to display a user interface including a plurality of icons, each icon representative of a respective communication interface module of a communication interface of the enterprise communication computing device, (iii) receiving, from the enterprise communication computing device, a query including one or more user identifiers identifying respective one or more intended recipients of a message to be sent from the enterprise communication computing device, (iv) querying the data structure with the one or more user identifiers to retrieve the device identifier associated with each one or more user identifiers, (v) transmitting, to the enterprise communication computing device, a response including each retrieved device identifier, wherein receipt of the response populates a recipient field of the message to be sent with the retrieved device identifiers at the enterprise communication computing device, (vi) receiving, from the enterprise communication computing device, in response to the enterprise communication computing device transmitting the message to each user computing device associated with one of the retrieved device identifiers, a first reporting message including (a) at least one of the message sent by the enterprise communication computing device and a proxy message including at least a portion of content of the message, and (b) a list of the one or more user computing devices to which the message was transmitted, and (vii) storing, in the central data source, the first reporting message in a data location indexed according to a device identifier of the enterprise communication computing device. The computer-implemented method may include additional, less, or alternate functionality, including those discussed elsewhere herein.

In a further aspect, a method of enabling communication between an enterprise communication computing device and recipient computing devices based upon a unique, non-telephonic-based recipient computing device identifier associated with each recipient computing device may be provided. The method may be implemented by the enterprise communication computing device including a processor in communication with a memory device and a communication interface. The communication interface may include a plurality of modules including (i) a telephonic communication module for cellular telephonic communication with remote computing devices, (ii) a text-based messaging module for cellular text-based communication with remote computing devices, and (iii) a two-way radio communication module for two-way push-to-talk (PTT) communication with remote computing devices.

The method may include (i) generating a user interface for execution on the enterprise communication computing device, the user interface including a display with a plurality of icons, each icon representative of a corresponding module of the plurality of modules, (ii) receiving, from within the user interface executed on the enterprise communication computing device, a user selection of a first icon of the plurality of icons, the first icon representative of a first module of the plurality of modules, (iii) executing the first module represented by the selected first icon, (iv) receiving user input defining a message to be sent using the first module and including one or more user identifiers identifying respective one or more intended recipients of the message to be sent, (v) transmitting, to a remote data source, a query including the one or more user identifiers, (vi) receiving, from the remote data source, one or more recipient computing device identifiers of a respective one or more recipient computing devices, each recipient computing device associated with a respective one of the intended recipients of the message to be sent, wherein each recipient identifier includes a unique non-telephonic-based identifier associated with the respective recipient computing device, and (vii) transmitting, via the first module, the message to each recipient computing device identified based upon the received recipient computing device identifiers. The computer-implemented method may include additional, less, or alternate functionality, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
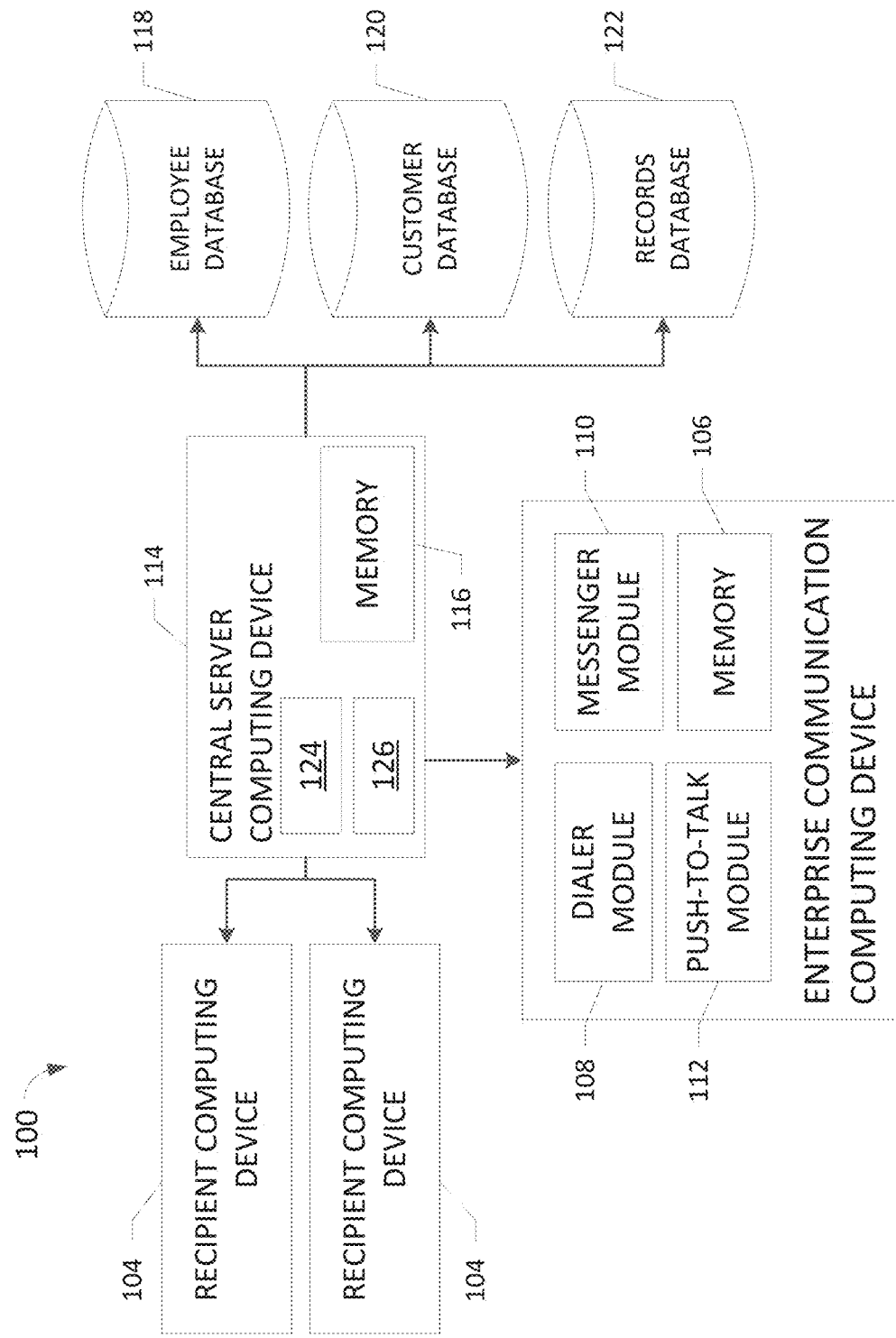
FIG. 1 depicts a view of an exemplary embodiment of an enterprise communication system for enabling communication between an enterprise communication ("EC") computing device and recipient computing devices based upon unique, non-telephonic-based recipient computing device identifiers associated with each recipient computing device.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, improved systems and methods for enabling communication between an enterprise communication ("EC") computing device and recipient computing devices based upon (i) a recipient computing device identifier associated with a user's (e.g., an intended recipient) computing device (e.g., a recipient computing device), and (ii) a user identifier (e.g., a recipient identifier, an alias, etc.) associated with the user (e.g., recipient). In the exemplary embodiment, both the recipient computing device identifier and the user identifier are unique, non-telephonic-based identifiers. The recipient computing device identifier may be a mobile equipment identifier ("MEID") associated with the recipient computing device. The user identifier may be an alias registered with the recipient, such as a username.

The systems and methods described herein overcome the deficiencies of other known systems. In one exemplary embodiment, the process may be performed by an EC computing device. The EC computing device may enable a user, such as an administrator (e.g., a human communication administrator, an emergency service provider or alert system, an artificial intelligence ("AI") system, and/or an administrator of an organization) to efficiently determine communication groups having at least one intended message recipient. The EC computing device may identify the intended recipients using an alias or unique identifier, thereby eliminating the need to use personally identifying information ("PII"), such as telephone numbers.

In the exemplary embodiment, the administrator may wish to send a content message (e.g., a communication message, an alert, an alert message, etc.) to one or more intended recipients. The administrator may provide the EC computing device with the content message and one or more recipient identifiers. The EC computing device may transmit the determined message inputted and/or selected by the administrator to the intended recipients. In some embodiments, the administrator may include pre-determined responses, or "request-responses," (e.g. response options) to transmit with the message. The intended recipients may select, from the response options, a response, and may relay the response back to the EC computing device for display to the administrator and/or for recordation purposes. In some embodiments, the EC computing device may aggregate responses from multiple recipients into a visual format such as a pie chart, bar chart, or heat map. In some embodiments, EC computing device may receive notification that a message was received by a recipient computing device, and generate a status message including a status indicator indicating whether a transmitted message was received by the recipient.

The EC computing device may generate a user interface displayed thereon to enable the administrator to interact with the EC computing device. The user interface may include icons representing different communication modules such as telephonic, messaging, or push-to-talk ("PTT"). The administrator may select a communication module to initiate communication with an individual or a mass communication with a group of intended recipients. The EC computing device may prompt the administrator to select an intended recipient or group of recipients. In the exemplary embodiment, the EC computing device may provide a list of individuals or list of groups for selection. In some embodiments, the EC computing device may allow the administrator to manually input intended recipients by entering a name or other non-telephonic identifier. In the exemplary embodiment, the EC computing device may display and receive intended recipients by user name. Each user name may be associated with a unique user identifier (e.g., an alias). Intended recipients of a message may be validated prior to transmission of the message to the recipients to ensure that only appropriate individuals receive the message (e.g., those who have consented to receiving messages). Validation may include retrieving and/or cross-checking multiple databases to confirm that rules and/or requirements for message receipt by intended recipients are met.

In some embodiments, individual recipients or groups of recipients may automatically be generated using AI and/or machine learning models. The EC computing device may retrieve relevant data from a database that stores recipient characteristics (e.g., geographic, demographic, professional specialty, enterprise-assigned groupings, etc.). A list or lists of intended recipients may be generated by analyzing large volumes of relevant data to accurately determine appropriate communication message (e.g., content message) recipients. The list of intended recipients may also be dependent on the type of message to be communicated, the time of day (e.g., whether certain personnel are on duty, etc.). For example, for a natural disaster occurring around Atlanta, employees participating in the enterprise communication system may be determined to be assigned to the Atlanta emergency response group. The EC computing device may present the generated list to an administrator to initiate a group communication with message content relevant to the geographic region and for the specific event (e.g., instructions to the employees indicating assembly at an identified staging area).

In the exemplary embodiment, EC computing device may provide at least one communication module to use (e.g., dialer, messaging, push-to-talk, etc.). Upon selection of a communication module, the EC computing device may prompt the administrator to select a pre-determined message to transmit and/or provide an option to manually input a message to transmit. Pre-determined messages may be generated using intelligent means such as AI. For example, data related to a natural disaster may be received from an external source. The EC computing device may present an alert message related to the event for transmission. The administrator need only confirm the transmission.

In some embodiments, if a message is manually inputted, the EC computing device may parse the message using natural language processing and/or other AI and/or machine learning to intelligently determine whether additional information should be provided. For example, if an inclement weather event message is prepared, the EC computing device may retrieve and/or generate an additional link (e.g., hyperlink, URL, etc.) to provide recipients with additional information via selection of the link.

In the exemplary embodiment, the EC computing device uses the recipient identifiers to determine the contact information for the associated user so that the message may be transmitted to the intended recipient. If encrypted communication is desired, the EC computing device may additionally perform steps to encrypt (e.g., DES, RSA, AES, PGP, SSL/TLS, etc.) the provided text and/or audio and/or video message. A recipient using a recipient computing device may decrypt the encrypted message upon receipt of the message. The recipient may be required to authenticate into the recipient computing device to receive the message. In some embodiments, the recipient may be prevented from receiving and/or viewing the encrypted message if authorization to receive the message is not confirmed or if the recipient is not properly authenticated.

Registration of users for the enterprise communication system includes an opt-in procedure where users "opt in" (e.g., provide informed consent) to receiving messages from the EC computing device. This allows the enterprise communication system to be in compliance with consumer protection laws and privacy regulations, such as the Telephone Consumer Protection Act. Thus, a user opts in to the enterprise communication system and consents to receive communication messages when they download the app (e.g., app 502, shown in FIG. 5). In other embodiments, the user may opt in and provide consent by transmitting a consent message to the EC computing device. The consent message may indicate user consent from the user in transmitting and receiving messages at the user's recipient computing device. Use of non-telephonic identifiers (e.g., aliases) may be used to enable communication between registered users while maintaining privacy preferences and/or requirements.

In some embodiments, the enrollment data and/or other collected data may be anonymized and/or aggregated prior to receipt such that no PII is received. In other embodiments, the system may be configured to receive application data and/or other collected data that is not yet anonymized and/or aggregated, and thus may be configured to anonymize and aggregate the data. In such embodiments, any PII received by the system is received and processed in an encrypted format or is received with the consent of the individual with which the PII is associated.

In situations in which the systems discussed herein collect personal information about individuals, or makes use of such personal information, the individuals may be provided with an opportunity to control whether such information is collected and/or control how such information is used. For example, the EC computing device may generate a settings user interface to enable a user to configure settings options including disabling certain functionality of the EC computing device. In addition, certain data may be processed in one or more ways before it is stored or used, so that PII is removed. Alternatively or additionally, a user may affirmatively opt-out of the enterprise communication system via a user interface provided by the EC computing device and/or a remote server or by deleting or otherwise removing any software or app installed on the user computing device performing enterprise communication functions.

The enterprise communication computing system may also be configured to prevent access to certain PII by securely encrypting the information in a local or remote database with restricted access rights. Decryption of secured data may thus be limited to authorized computing devices and/or personnel authenticated within a safe zone (e.g., physically present at a specified location). Further, PII may be in a hashed format (e.g., SHA-1, SHA-2, MD5) and unreadable by a human user.

In another exemplary embodiment, the process may be performed by at least one frontend system, such as an EC computing device, and/or at least one backend system, such as a centralized server. In the exemplary embodiment, the message, the request-response, and the recipient identifiers associated with the intended recipients may be transmitted to a central server which may perform the step of determining the contact information for the associated user before transmitting the message to the intended recipients. In some embodiments, the central server may be a web server that may be in communication with at least one EC computing device, at least one recipient computing device, a third-party computing device, and/or a communication network (e.g., the Internet, cellular networks, etc.) including communication devices (e.g., radio transmitter and receivers, satellites, or other devices for transmitting and receive communication messages).

In a further exemplary embodiment, at least two EC computing devices may be configured to communicate directly with each other using near field communication. If the EC computing device is prevented from using other means of communication, the EC computing device may be configured to detect other EC computing devices. For example, a user W attempting to communicate with a user D during a power outage may be unable to communicate via a WiFi network. Additionally, if cellular networks are overloaded and user W and user D are physically separated by a distance where near field communication or radio can be used, user W may initiate communication via a local radio frequency using EC computing device. More specifically, EC computing device may be configured to utilize any radio transmitter capable of low frequency radio transmission and reception, low-power mid-frequency transmission and reception, low-power high frequency transmission and reception, and/or any other radio frequency and power level capable of implementing short-range wireless, point-to-point communication between at least two EC computing devices.

EC computing device may activate push-to-talk functionality to facilitate real time communication to an EC computing device associated with user D. In this configuration, the EC computing devices may store, in a secure, encrypted database, non-telephonic user identifiers to identify nearby EC computing devices to enable selection of an intended recipient. In some embodiments, if user W moves outside the range of the local radio frequency, short-range wireless communication methods, such as those as described above, may become unavailable. In such instances, communication may be re-established via alternative methods of communication (e.g., WiFi, cellular, etc.) that are available. In some embodiments, each EC computing device may temporarily store, in a local memory location, transmitted communication messages. Upon re-establishment of communication with other EC computing devices and/or a central server, each EC computing device may upload to the central server and/or otherwise transfer to other EC computing devices, the temporarily stored messages, thereby maintaining continuity of communication messages.

At least one of the technical problems addressed by this system includes enabling secure individual, group, or mass communication using a single EC computing device with a combined unified user interface capable of activating multiple communication functions each capable of multiple types of messaging. More specifically, the systems, methods, and computer-readable media described herein provide an efficient and reliable enterprise communication process that utilizes recipient identifiers, groups of intended recipients, and segregated secure databases (e.g. data stores) to dynamically define communication groups of intended recipients, thereby enabling a user-administrator to initiate communication with intended recipients seamlessly using non-telephonic device identifiers and intelligent smart-grouping.

Exemplary technical effects of the systems, methods, and computer-readable media described herein may include, for example: (i) enabling communication using a unified communication system; (ii) leveraging multiple distributed database systems to identify communication message recipients; (iii) enabling intuitive identification of communication message recipients using non-telephonic identifiers; (iv) rapid and dynamic identification of message recipient groups using artificial intelligence and machine learning; (v) enabling response options for mass communication; (vi) reducing the amount of bandwidth needed for mass communication; (vii) reducing the cost of maintaining and coordinating between multiple systems and parties to facilitate group or mass communication; and (viii) increasing the speed by which group or mass communication messages may be transmitted.

The methods and systems described herein may be implemented using computer programming or engineering techniques including computer software, firmware, hardware, or any combination or subset thereof to implement the functionalities of an enterprise communication ("EC") computing device, wherein the technical effects may be achieved by performing at least one of the following: (a) storing, in a central data source, a data structure associating a plurality of user identifiers with a plurality of user computing devices and associating each user computing device with a respective unique non-telephonic-based device identifier that uniquely identifies the associated recipient computing device; (b) uploading, to an EC computing device, an enterprise communication application, wherein execution of the enterprise communication application on the EC computing device causes the EC computing device to display a user interface including a plurality of icons, each icon representative of a respective communication interface module of a communication interface of the EC computing device; (c) receiving, from the EC computing device, a query including one or more user identifiers identifying respective one or more intended recipients of a message to be sent from the EC computing device; (d) querying the data structure with the one or more user identifiers to retrieve the device identifier associated with each one or more user identifiers; (e) transmitting, to the EC computing device, a response including each retrieved device identifier, wherein receipt of the response populates a recipient field of the message to be sent with the retrieved device identifiers at the EC computing device; (f) receiving, from the EC computing device, in response to the EC computing device transmitting the message to each user computing device associated with one of the retrieved device identifiers, a first reporting message including (i) at least one of the message sent by the EC computing device and a proxy message including at least a portion of content of the message, and (ii) a list of the one or more user computing devices to which the message was transmitted; and (g) storing, in the central data source, the first reporting message in a data location indexed according to a device identifier of the EC computing device.

Exemplary System for Enterprise Communication

FIG. 1 depicts a view of an exemplary embodiment of an enterprise communication system 100 for enabling communication between an enterprise communication ("EC") computing device 102 and recipient computing devices 104 based upon a unique, non-telephonic-based recipient computing device identifier associated with each recipient computing device 104.

In the exemplary embodiment, EC computing device 102 and recipient computing devices 104 may be any user computing device communicatively coupled to a central server 114 using a number of interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. EC computing device 102 and recipient computing devices 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices so long as it is capable of transmitting and/or receiving communication messages transmitted from EC computing device 102, recipient computing device 104, and/or central server 114 and displaying or otherwise allowing a user (e.g., recipient 402, shown in FIG. 4) to receive and/or respond to communication messages.

In the exemplary embodiment, EC computing device 102 may be any user computing device capable of performing the functions as described herein. EC computing device 102 may include a memory 106, described further below. EC computing device 102 may include communication modules such as dialer module 108, messenger module 110 and push-to-talk ("PTT") module 112. In the exemplary embodiment, EC computing device 102 may generate a user interface including icons representing at least dialer module 108, messenger module 110, and PTT module 112. A user (e.g., a communication administrator) may interact with EC computing device 102 via the generated user interface by selecting and/or activating icons. EC computing device 102 may be implemented on a user computing device with a touchscreen display responsive to gestures, presses, or other touch-activated methods. In some embodiments, EC computing device 102 may be configured for voice activation of the communication modules. In some embodiments, EC computing device 102 may be implemented on a user computing device specifically designed to implement the functionality of EC computing device 102 as described herein and may include alternative or additional methods for activation of the communication modules.

Upon activation of an icon representing a communication module, EC computing device 102 may execute the selected communication module by activating functionality associated with the selected communication module. In the exemplary embodiment, dialer module 108 may be configured to initiate telephonic communication. Upon activation of dialer module 108, EC computing device 102 may receive a list of intended user identifiers associated with recipients designated by the administrator. The list of potential intended recipients may appear as unique user identifiers and/or symbols and/or images representing individuals and/or groups. For example, an identifier may be associated with a particular call tree such that the administrator may select the identifier to initiate the call tree.

In other embodiments, EC computing device 102 displays a number-pad and prompts the administrator to select a number combination associated with an intended recipient. EC computing device 102 may display an input field enabling the administrator to manually input a user identifier as a string. EC computing device 102 may be configured to automatically detect complete or partially complete sequences of numbers or manually input strings and process the input to initiate communication as described further below. In some embodiments, EC computing device 102 may additionally prompt the administrator to input additional number sequences to generate a list of intended recipients.

In the exemplary embodiment, messenger module 110 enables the transmission of messages between EC computing device 102 and at least one recipient computing device 104. Messenger module 110 may include a plurality of functions such as individual text-based messaging, group text-based messaging, confidential messaging, and audio and/or video recording. Individual text-based messaging may include manual input of a text message by the administrator via an input tool such as a virtual keyboard. In some embodiments, messenger module 110 may display a plurality of pre-defined text messages selectable from, for example, a drop-down box or scrollable list. Group text-based messaging may be implemented similarly. The selection of a group of recipients is described above. Messenger module 110 may be configured to enable audio and/or video recording using a built-in and/or external microphone and camera in communication with the EC computing device 102. Messenger module 110 may present options to select between audio or video recordings. Text-based, audio, and/or video recordings may be stored in a memory location such as memory 106. Stored messages may be transmitted after a predetermined period of delay. In some embodiments, if certain communication functionality is not available (e.g., WiFi is unavailable), alternate communication methods may be used (e.g., cellular networks).

In the exemplary embodiment, PTT module 112 may enable instantaneous communication between EC computing device 102 and at least one recipient computing device 104. Instantaneous push-to-talk communication in this context refers to real time transmission and reception of video and/or audio between PTT module 112 and the intended recipients at the moment of transmission or within milliseconds of transmission.

The administrator may activate the PTT module 112 to initiate PTT communication. PTT module 112 may prompt the administrator to begin transmitting a message to the intended recipients. PTT module 112 may include an activation key indicating active transmission while the activation key is activated (e.g., pressed) by the administrator. Deactivation and/or release of the activation key may disengage and/or discontinue reception and/or transmission of any message vocalized by the administrator. In some embodiments, any vocalized communication may be recorded and stored in memory 106.

In the exemplary embodiment, PTT module 112 may be implemented by a network such as the Internet, a WiFi network, or a cellular network. In other embodiments, PTT module 112 may be implemented by radio broadcast communication, such as two-way radio (e.g., portable walkie-talkies, citizens band ("CB") radio, Hertz-Armstrong-Marconi ("HAM") radio, etc.). More specifically, PTT module 112 may utilize any radio transmitter capable of low frequency radio transmission and reception, low-power mid-frequency transmission and reception, low-power high frequency transmission and reception, and/or any other radio frequency and power level capable of implementing short-range wireless, point-to-point communication between at least two EC computing devices 102.

In some embodiments, PTT module 112 may prioritize communication protocols. For example, PTT module 112 may attempt to initiate a PTT communication with a recipient computing device over a WiFi network. If no WiFi networks are available, PTT module 112 may attempt to initiate a PTT communication with a recipient computing device via a cellular network. In some embodiments, PTT module 112 may be configured to attempt to initiate a PTT communication with a recipient computing device using near field communication transmissions such as BLUETOOTH™.

In the exemplary embodiment, enterprise communication system 100 may be in communication with central server computing device 114. Central server 114 may be communicatively coupled to EC computing device 102 and to recipient computing device 104. Central server 114 may be configured to retrieve data from data sources, perform validation procedures, and relay communication messages between EC computing device 102 and recipient computing devices 104. Central server computing device 114 may include a memory 116 for storing communication messages, data from third-party sources, and other data, described further below.

Central server computing device 114 may be in communication with an employee database 118. Employee database 118 may include information such as pre-defined groupings of potential communication message recipients. For example, user information stored in employee database 118 may identify a first employee as associated with an accounting group while a second employee may be associated with an executive group. Central server computing device 114 may be in communication with customer database 120. Customer database 120 storing data associated with a customer may include, for example, name, address, telephone number, category of type of customer or other customer classification, etc. In some embodiments, central server 114 may use information retrieved from customer database 120 to determine groups of communication message recipients. Central server computing device 114 may be in communication with records database 122. Records database may be configured to store communication messages, recipient information, and the like.

Databases 118, 120, and 122 may be any computer or computer program that provides database services to one or more other computers or computer programs. Databases 118, 120, and 122 may store any organized collection of data, such as, for example, any data organized as part of a relational data structure, any data organized as part of a flat file, and the like. In one embodiment, databases 118, 120, and 122 may be Hadoop® Distributed File System (HDFS). In other embodiments, databases 118, 120, and 122 may be a non-relational database, such as APACHE Hadoop® database.

Databases 118, 120, and 122 may be communicatively coupled to central server 114 and may receive data from, and provide data to, central server 114, such as in response to one or more requests for data, which may be provided via a database management system (DBMS) implemented on central server 114, such as SQLite, PostgreSQL (e.g., Postgres), or MySQL DBMS. Databases 118, 120, and 122 may be a scalable storage system that includes fault tolerance and fault compensation capabilities. Data security capabilities, such as encryption and decryption, may also be integrated into databases 118, 120, and 122.

In some embodiments, databases 118, 120, and 122 may be decentralized. In the exemplary embodiment, an administrator may access databases 118, 120, and 122 via central server 114 using EC computing device 102 as described above. In other embodiments, a third-party may also access databases 118, 120, and 122 via central server 114 using third-party computing devices and/or EC computing device 102.

Central server 114 may be configured to perform validation of intended recipients using a validation module 126. EC computing device 102 may identify intended recipients using non-telephonic user identifiers. Central server 114 may receive the non-telephonic user identifier from EC computing device 102 and determine the associated computing devices for transmitting a message. For example, central server 114 may receive the user identifiers, and perform a lookup of the user identifiers in databases 118 and/or 120 using validation module 126 to perform validation steps and confirm that each intended recipient of a message remains opted into enterprise communication system 100. In this example, central server 114 may utilize validation module 126 to retrieve up-to-date recipient status information for each intended recipient. Status information may include a consent status and/or policyholder status as of the date of retrieval, as well as information such as a policy expiration date for a recipient. Validation module 126 may utilize a validation script programmed to execute on central server 114. The validation process may also include verifying the accuracy of the stored data by, for example, examining the point in time (e.g. date and time) of when the record was last updated.

Alternatively or additionally, examination of the classification of the identified user in the customer database may be further performed to determine whether the user satisfies predefined rules or criteria. For example, a rule stored in memory 116 may require that messages may only be transmitted to users that have affirmatively opted into receiving any communications. The validation process may be configured to determine if potential intended recipients have opted out of the enterprise communication system 100. The validation process may also include verification of the location of the intended communication message recipient. For example, for an event affecting policyholder recipients located in Hawaii, messages may be limited to recipients determined to be registered as a policyholder in Hawaii. In some embodiments, messages may be applicable to a certain time period. For example, messages may cease after an inclement weather event expected to last two hours. The message contents may further determine whether additional rules may be applied to determine appropriate message recipients. In some embodiments, a smart-message system using artificial intelligence ("AI") system may be used, as described further below.

Central server 114 may also be in communication with third party and/or external data sources. Central server 114 may utilize a model builder module 124 to build models that utilize AI algorithms to analyze communication message content to determine relevant data sources. For example, inclement weather event messages included in the communication message input by the administrator may be analyzed to determine that additional information from a remote web server such as WEATHER.COM™ may be retrieved and added to the message. A variety of AI systems may be used by central server 114 such as IBM WATSON™. The AI system may include information or a link in the communication message such that a recipient may activate the link or use the relevant information accordingly (e.g., applying tape over windows, appropriate supplies to include in a backpack of emergency tools and supplies, etc.). Use of intended recipient information by the AI system may further enable customization of the message to provide real time AI information pertinent to the situation. For example, recipient information including location information (e.g., GPS, GIS, longitudinal and latitude data) may provide intelligent identification of recipients for a natural disaster event in Hawaii. Central server 114 may use AI systems to include additional smart-message information (e.g., safe locations, access to water, aid stations with available blankets and/or clothing, etc.) to a mass communication broadcast.

In the exemplary embodiment, EC computing device 102 and recipient computing devices 104 may be computers that include a web browser or a software application that enables EC computing device 102 and recipient computing devices 104 to access remote servers, such as central server 114 using a network such as the Internet or other network. More specifically, EC computing device 102 and recipient computing devices 104 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

In the exemplary embodiment, recipient computing devices 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Recipient computing devices 104 may be any personal computing device and/or any mobile communications device of a user, such as a personal computer, a tablet computer, a smartphone, and the like. Recipient computing devices 104 may be configured to present an application (e.g., a smartphone "app") or a webpage, such as a webpage or an app for processing or viewing images associated with an communication (e.g., enterprise communications). To this end, recipient computing devices 104 may include or execute software, such as a web browser, for viewing and interacting with a webpage and/or an app. Although two recipient computing devices 104 are shown in FIG. 1 for clarity, it should be understood that enterprise communication system 100 may include any number of recipient computing devices 104.

Figure 4:
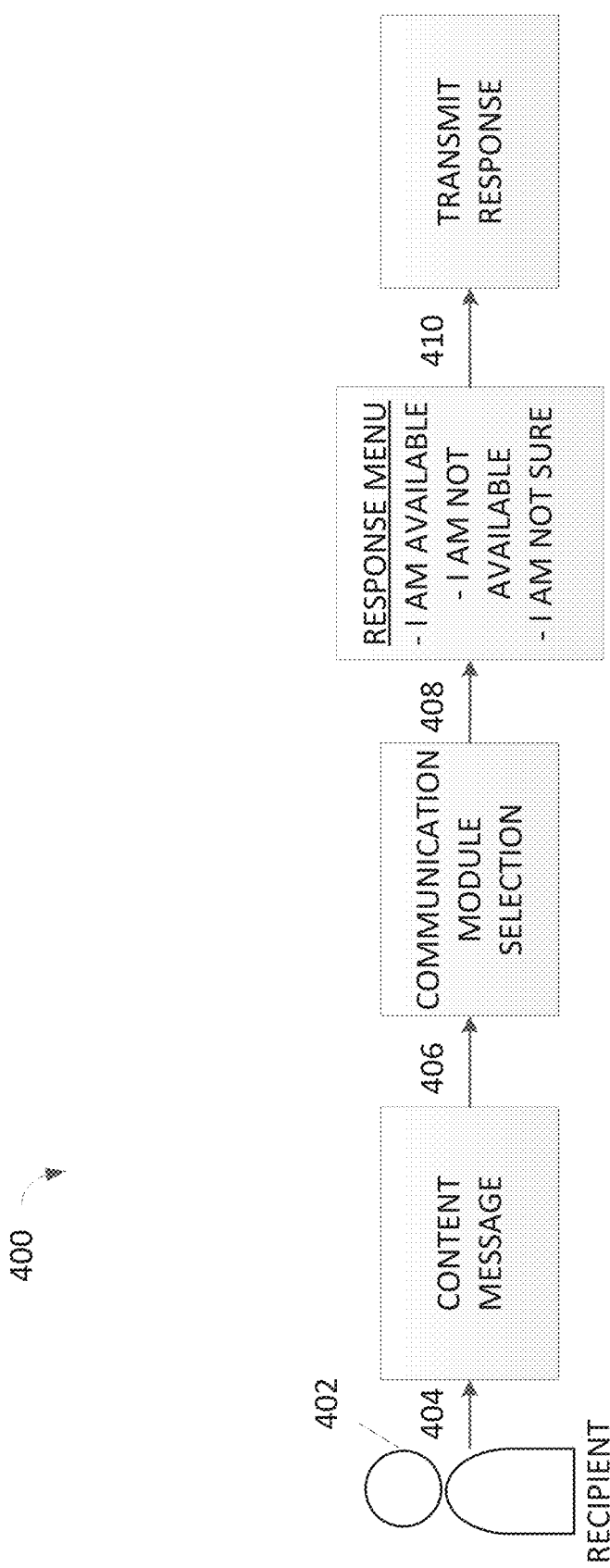
FIG. 4 is an exemplary flow diagram illustrating a process between a recipient and the EC computing device for receiving a message from an administrator on a recipient computing device in real time.

In the exemplary embodiment, central server 114 is configured to communicate with EC computing device 102 and recipient computing devices 104 associated with a user, such as recipient 402 (shown in FIG. 4). Central server 114 may be any computer or computer system that is configured to receive and process requests made via HTTP. In some embodiments, central server 114 may also be configured to receive and process requests made via HTTPS.

In various embodiments, central server 114 may be directly coupled to databases 118, 120, and 122 and/or communicatively coupled to databases 118, 120, and 122 via a network. Central server 114 may, in addition, function to store, process, and/or deliver communication messages and/or any other suitable content to EC computing device 102 and recipient computing devices 104. Central server 114 may, in addition, receive data, such as data provided to EC computing device 102 and recipient computing devices 104 and/or communication messages from EC computing device 102 and recipient computing devices 104 for subsequent transfer to databases 118, 120, and 122.

In some embodiments, central server 114 may be associated with, or is part of a computer network associated with a third party such as insurance provider (not shown). In other embodiments, central server 114 may be associated with a third party and is merely in communication with third parties using third party computing devices.

In various embodiments, central server 114 may implement various hardware and/or software, such as, for example, one or more communication protocols, one or more message brokers, one or more data processing engines, one or more servlets, one or more application servers, and the like. For instance, in one embodiment, central server 114 may implement an Internet of Things (IoT) protocol, such as a machine-to-machine IoT communications protocol (e.g., an MQTT protocol). In addition, in various embodiments, central server 114 may translate a message or communications from a messaging protocol of a sending device to a messaging protocol of a receiving device (e.g., RABBITTMQ, KAFKA, ACTIVEMQ, KESTREL) Further still, in some embodiments, central server 114 may implement a data processing engine, such as a cluster computing framework like APACHE SPARK. In addition, in various embodiments, central server 114 may implement servlet and/or JSP server, such as APACHE TOMCAT.

Memory areas 106 and 116 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

EC computing device 102 is unconventional in that it is able to perform the unique steps described herein. A user of EC computing device 102 may interact with the user interface to view, explore, and otherwise interact with the functions as described herein (e.g., initiating group communications, initiating mass communications, etc.). In the example embodiment, the user interface is generated by EC computing device 102. In some embodiments, the user interface may be hosted by or stored on central server 114 and accessed by EC computing device 102. For example, a web portal may be stored on and executed by central server 114. Thus, EC computing device 102 may provide inputs to the web portal. The inputs are received by central server 114 and used to execute functions as described above. The web portal may further provide outputs to EC computing device 102. The web portal may be a website (e.g., central server 114), application, or other tool.

Although the components of enterprise communication system 100 are described above and depicted at FIG. 1 as being interconnected in a particular configuration, it is contemplated that the systems, subsystems, hardware and software components, various network components, and database systems described herein may be variously configured and interconnected and may communicate with one another within the enterprise communication system 100 to facilitate the processes and advantages described herein. For example, although a single EC computing device 102, a single central server 114, two recipient computing devices 104, an employee database 118, and a single customer database 120, and single records database 122 are described above, it will be appreciated that system 100 may include any suitable number of interconnected, communicatively coupled, user computing devices, networks, servers, and/or databases. For example, more than one EC computing device 102 may be in communication with central server 114. Additionally, central server 114 may be implemented by a distributed system. Further, although certain functions, processes, and operations are described herein with respect to one or more system components, it is contemplated that one or more other system components may perform the functions, processes, and operations described herein.

Exemplary Client Device

Figure 2:
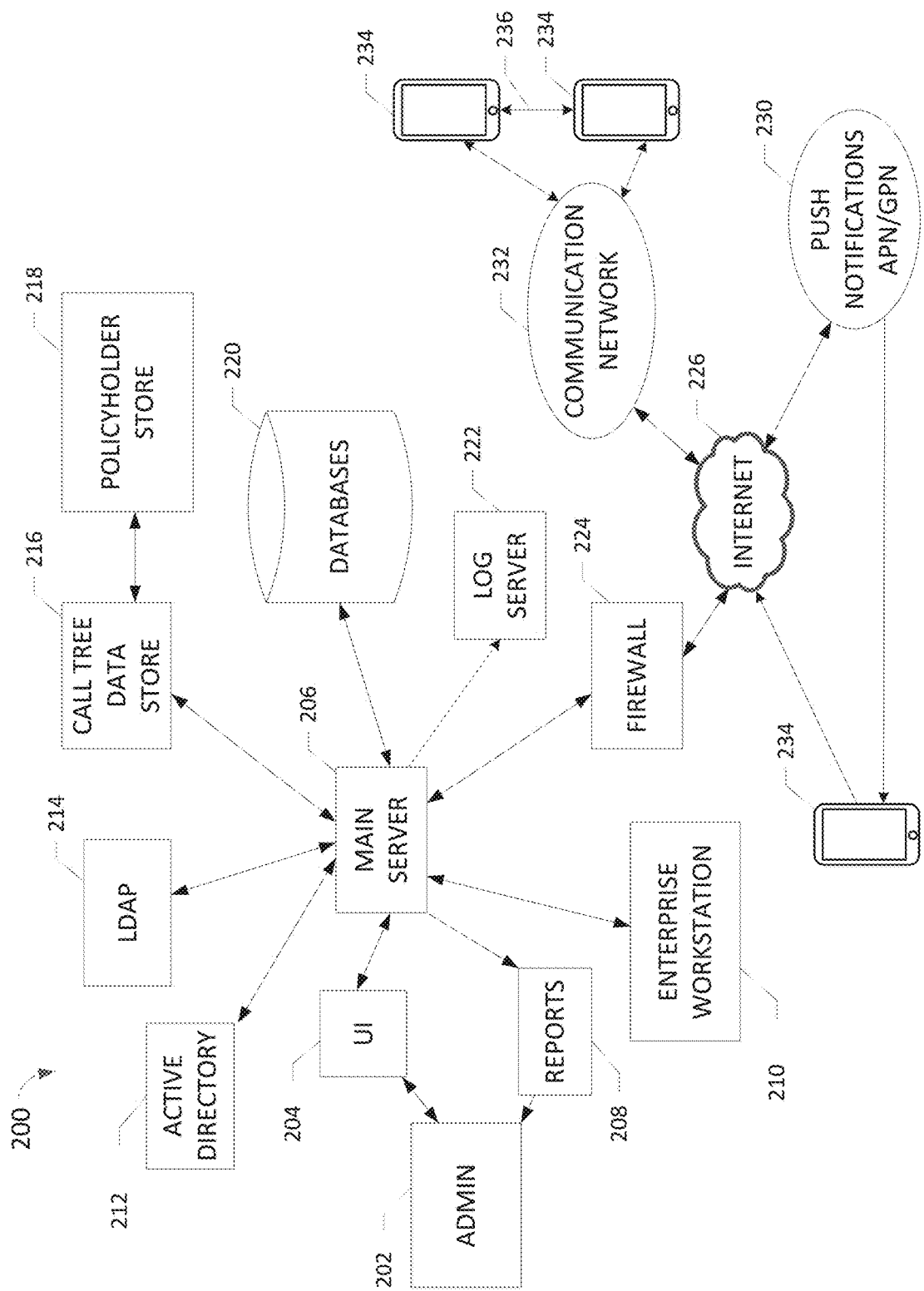
FIG. 2 depicts another exemplary configuration of an enterprise communication system.

FIG. 2 depicts another exemplary configuration 200 of an enterprise communication system. In the exemplary embodiment, exemplary configuration 200 may be similar to enterprise communication system 100 (shown in FIG. 1), and may include similar components and functionality of enterprise communication system 100.

Exemplary configuration 200 may include an administrator ("admin") computing device 202. In some embodiments, admin computing device 202 may be EC computing device 102 (shown in FIG. 1) or a similar user computing device. Admin computing device 202 may include a user interface (UI) 204 performing the same or similar functionality as described above for EC computing device 102. UI 204 may include a number of modules as described above, configured to communicate with a main server 206. Admin computing device 202 may receive reports 208 generated by main server 206 and may display reports 208 to an administrator using admin computing device 202.

Exemplary configuration 200 may include an enterprise workstation 210 configured to perform the same or similar enterprise communication functions similar to admin computing device 202 and/or EC computing device 102 as described above. As such, enterprise workstation 210 may be in communication with main server 206.

Main server 206 may be in communication with an active directory service 212. Main server 206 may use active directory service 212 to perform authentication, authorization, and management of computing devices in communication with main server 206. For example, admin computing device 202 may be stored in active directory service 212 and assigned an administrative grouping while enterprise workstation 210 may be stored in active directory service 212 and assigned an employee grouping. Alternatively or additionally, main server 206 may be in communication with active directory service 212 and/or other directory services using a lightweight directory access protocol (LDAP) 214. LDAP 214 may enable main server 206 to retrieve information associated with user computing devices such as domain and/or group assignments.

In the exemplary embodiment, main server 206 may be in communication with a call tree database (e.g., call tree data store) 216. Call tree data store 216 may be a memory location such as a database configured to maintain a data structure of updated nodes where each node represents a user. In some embodiments, the nodes may be interlinked such that different groups of users may be efficiently determined by traversal of the nodes. For example, a first node may be identified as a user associated with and/or assigned to an information technology (IT) role. Subsequent nodes linked to the first node may thus be automatically defined as associated with or assigned to an IT role. Further specification may be applied to filter and/or sort data stored in call tree data store 216 to identify relevant users in a group. In the exemplary embodiment, call tree data store 216 may be in communication with a policyholder store 218. Policyholder store 218 may be configured to store and maintain updated information for users and associated policies. For example, policyholder store 218 may retain information about insurance policies and associated users (policyholders) including types of insurance policies and dates of activation and/or deactivation. Policyholder store 218 may transmit additional data to call tree data store 216 to include for main server 206 to parse and/or analyze. Main server 206 may exclude and/or include communication recipient message recipients based upon data received from call tree data store 216 and/or policyholder store 218.

Main server 206 may be in communication with databases 220 which may include employee data, recorded data (e.g., logs), and/or third-party data. Employee data in databases 220 may include, for example, assigned and/or designated enterprise groups (e.g., IT, accounting, legal, etc.), and be used to determine communication messaging groups. For example, a new accounting procedure may cause main server 206 to retrieve employees with an accounting designation. Main server 206 may be in communication with a log server 222 which may be configured to record or otherwise store previously transmitted communication messages. Past communication messages may be used to analyze performance and effectiveness of enterprise communication system 100. In some embodiments, log server 222 may include responses received from recipients as described above. Response data may be used to quickly identify unreachable or unresponsive recipients and to determine whether additional communication messaging propagation is required.

Exemplary configuration 200 may include a firewall 224. Main server 206 may access external networks such as the Internet 226 through firewall 224. Firewall 224 may be configured to detect and deny access to fraudulent access attempts and/or prevent infiltration by malicious parties. Additional or alternative security measures may also be implemented to prevent compromising the security and integrity of exemplary configuration 200. In exemplary configuration 200, main server 206 communicates with a remote user computing device 234 via Internet 226. In exemplary configuration 200, a third-party push notifications APN/GPN 230 service may be used in conjunction with main server 206 to provide messages to alert user computing device 234 of messages transmitted from main server 206. In exemplary configuration 200 a third party communication network 232 may be used to facilitate communication to user computing devices 234. Communication network 232 may enable communication between main server 206 and user computing devices 234 via Internet 226. In some embodiments, user computing devices 234 may be configured to communicate directly using near field communication 236.

Exemplary Administrator Flow Diagram

Figure 3:
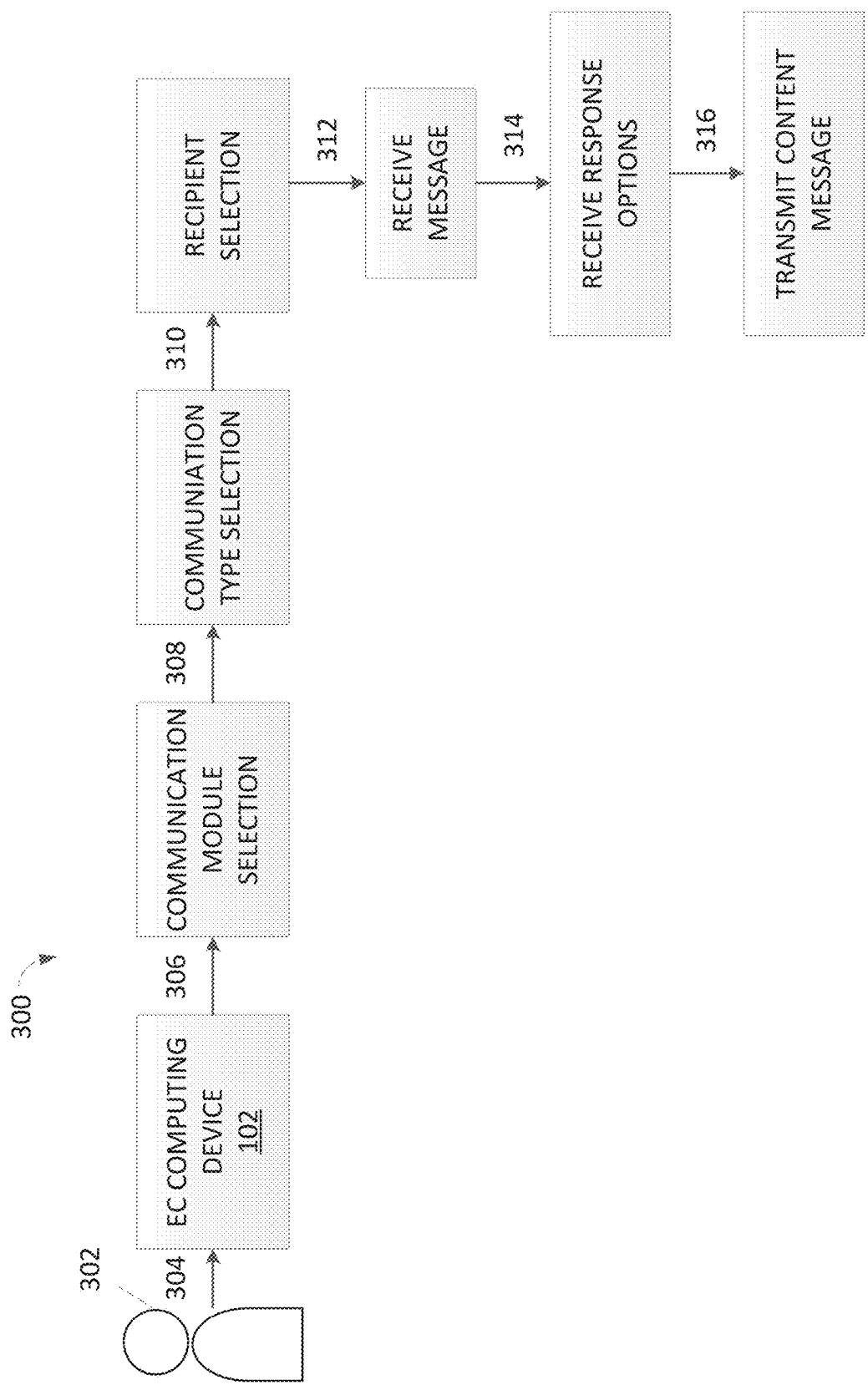
FIG. 3 is an exemplary flow diagram illustrating a process between an administrator and the EC computing device for transmitting a message to a group of recipients in real time.

FIG. 3 is an exemplary flow diagram 300 illustrating a process between an administrator 302 and enterprise communication ("EC") computing device 102 (shown in FIG. 1) for transmitting a message to a group of recipients in real time. In particular, flow diagram 300 illustrates exemplary steps administrator 302 may take to initiate communication between a group of recipient computing devices, such as recipient computing device 104 (shown in FIG. 1). In the exemplary embodiment, EC computing device 102 may be a user computing device (such as user computing device 234, shown in FIG. 2) in which a user interface generated by EC computing device 102 is executed thereon. EC computing device 102 may be in communication with a central server computing device 114 (shown in FIG. 1), which is in communication with a plurality of recipient computing devices 104 (shown in FIG. 1).

In the exemplary embodiment, administrator 302 accesses EC computing device 102 to transmit 304 a message (e.g., content message) to a plurality of recipients. The message may be an alert message transmitted to a group of administrators (e.g., high-level employees) who manage a specific geographical area or a group of customers (e.g., insurance policyholders) in an affected geographical area. Administrator 302 may launch the app to access EC computing device 102. In the exemplary embodiment, administrator 302 selects 306 a communication module for the content message from a plurality of communication modules provided by EC computing device 102. The communication module may be one of a telephonic communication module (e.g., a dialer feature), a text-based messaging module (e.g., a messenger feature) for wireless communication (e.g., cellular, Internet), and a two-way radio communication module (e.g., a walkie-talkie feature) for two-way push-to-talk ("PTT") communication, as described above.

In the exemplary embodiment, EC computing device 102 subsequently receives 308, from administrator 302, a selection of a communication type for the content message. For example, at step 2, administrator 302 may select the telephonic communication module to deliver a hurricane alert message for an affected geographic area in Hawaii. Upon selecting the telephonic communication module, administrator 302 may be provided with a plurality of communication types specific to the telephonic communication module. For example, administrator 302 may be provided with communication types, such as transmitting the content message via telephonic communication to an individual, a predefined group of recipients, a mass group of recipients, and/or initiating a call tree. In the above example, administrator 302, at step 3, may select to transmit the hurricane alert message to a predefined group of recipients via the telephonic communication module.

In the exemplary embodiment, EC computing device 102 receives 310, from administrator 302, a selection of designated recipients for the content message. In some embodiments, steps 3 and 4 may be performed simultaneously. Administrator 302 may provide EC computing device 102 with recipient identifiers associated with the designated recipients. In other embodiments, administrator 302 may be presented with a list of recipient identifiers when administrator 302 selects a communication type within a corresponding communication module. In the above example, administrator 302 may be presented with a plurality of predefined groups, where each group is populated with a list of recipients. Each predefined group may correspond to a group of administrators managing/overseeing a specific geographic area. In the above example, administrator 302 may select a predefined group associated with a group of high-level employees responsible for managing the affected area in Hawaii.

Upon receiving the recipient identifiers of the designated recipients, EC computing device 102 receives 312 the message to be transmitted from administrator 302. Administrator 302 may directly provide the message to EC computing device 102 as a text message and/or audio recording. In the exemplary embodiment, EC computing device 102 may further provide an input field enabling user entry, by administrator 302, of a plurality of response options for the designated recipients. Each response option may be responsive to the content of the content message being transmitted to the recipients. EC computing device 102 may receive 314 user entry of a plurality of response options from administrator 302 for the content message. For example, administrator 302 may provide response options, such as "I am available," "I am away/I am not available," and/or "I am not sure" for each recipient to select as his or her response to the content message.

In the exemplary embodiment, EC computing device 102 transmits 316 the content message with the plurality of response options to the designated recipients in real time. In some embodiments, EC computing device 102 may directly transmit the content message to the designated recipients via the selected communication module. In the exemplary embodiments, EC computing device 102 may transmit the content message via the selected communication module through central server computing device 114.

Exemplary Recipient Response Flow Diagram

FIG. 4 is an exemplary flow diagram 400 illustrating a process between a recipient 402 and enterprise communication ("EC") computing device 102 (shown in FIG. 1) for receiving a message from administrator 302 (shown in FIG. 3) on recipient computing device 104 (shown in FIG. 1) in real time. In the exemplary embodiment, recipient computing device 104 may be in communication with EC computing device 102 via central server computing device 114 (shown in FIG. 1). In further embodiments, recipient computing device 104 may be in direct communication with EC computing device 102, as described above.

In the exemplary embodiment, recipient 402 receives 404 the content message sent by administrator 302 on recipient computing device 104. Recipient 402 may access a software application ("app") on recipient computing device 104 to receive the content message from administrator 302. In the exemplary embodiment, recipient computing device 104 is configured to transmit a response message to administrator 302 for the received content message. In some embodiments, recipient computing device 104 may be EC computing device 102 with one or more communication modules disabled. In one example, recipient computing device 104, like EC computing device 102, may have a text-based messaging module and a two-way radio communication module, but may not have a telephonic communication module. In another example, recipient computing device 104 may be configured to receive incoming telephonic communications (e.g., phone calls) from administrator 302, but may be restricted from placing outgoing calls.

In the exemplary embodiment, recipient computing device 104 receives 406 a selection of a communication module for transmitting the response message. For example, the response message may be an audio or text-based message from recipient acknowledging the received content message. In one embodiment, the response message may be a text-based message from the recipient asking administrator 302 to provide further information. For example, recipient 402 may be an insurance policyholder in Hawaii, and receives a hurricane alert from his insurance company. In response, recipient 402 may transmit a response message asking for details as to the evacuation policy for the policyholder's geographic area and/or for further information as to shelters, food, and medical help. In another example, recipient 402 may be a high-level employee who is responsible for monitoring a geographic area that has been issued a hurricane warning and may wish to initiate certain actions defined in a response.

In the exemplary embodiment, recipient computing device 104 provides 408 a plurality of response options received from administrator 302 to respond to the received content message. In the exemplary embodiment, and with combined reference with FIGS. 3 and 4, EC computing device 102 may generate a response-request portion for the content message to transmit to recipient computing device 104. The response-request portion of the content message may be formatted on recipient computing device 104 as a drop-down menu that includes a plurality of response options. In the exemplary embodiment, recipient 402 may select a response from the drop-down menu of provided response options. As illustrated in FIG. 3, the drop-down menu may include responses, such as "I am available," "I am away/I am not available," and/or "I am not sure." For example, recipient 402 may be a high-level employee responsible for monitoring a geographic area that has been issued a hurricane warning. In this example, recipient 402 may receive a message from administrator 302 asking recipient 402 whether or not recipient 402 can report to a designated area within 2 hours to receive emergency instructions on hurricane preparedness. In response, recipient 402 may select one of the response options from the drop-down menu.

In the exemplary embodiment, central server computing device 114 may be configured to transmit 410 the response message to administrator 302 via EC computing device 102 in real time. Central server computing device 114 may aggregate response messages from multiple recipients 402 and transmit to administrator 302 a visual representation of receive responses such as a pie chart, bar chart, or heat map. In some embodiments, administrator 302 may reply to the response message from recipient 402. In further embodiments, ongoing messaging conversations may take place between administrator 302 and recipient 402. In these embodiments, central server computing device 114 may be configured to transmit messages back and forth between administrator 302 and recipient 402 via EC computing device 102 and recipient computing device 104.

Exemplary User Interfaces

Figure 5:
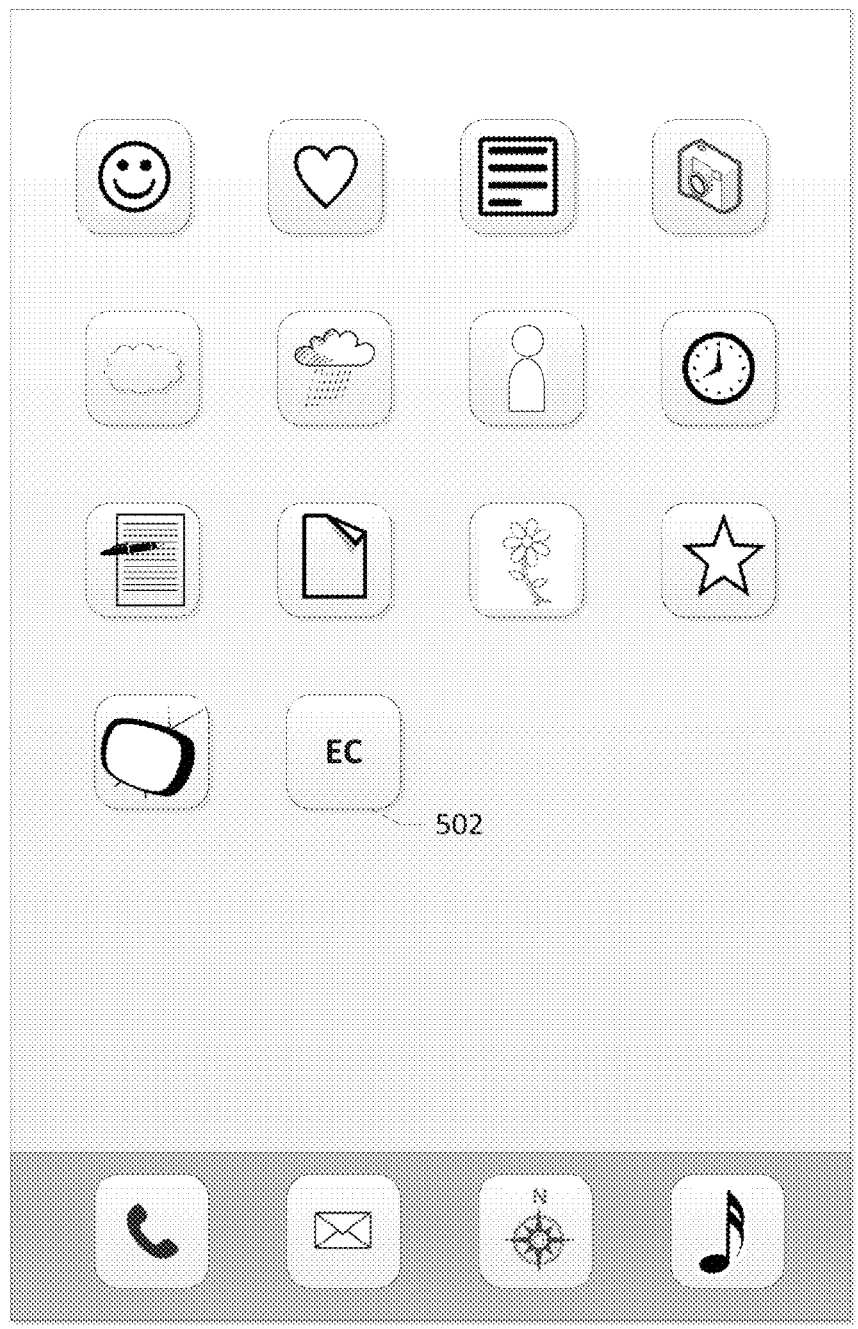
FIG. 5 illustrates an exemplary user interface for logging into or otherwise accessing an app associated with or executed by the EC computing device.

FIGS. 5-10 illustrate exemplary user interfaces generated by EC computing device 102 (shown in FIG. 1) for displaying on a user computing device (similar to user computing device 234 shown in FIG. 2) associated with a registered user, such as administrator 302 (shown in FIG. 3) and/or recipient 402 (shown in FIG. 4). FIG. 5 illustrates an exemplary user interface 500 for logging into or otherwise accessing an app 502 associated with or executed by EC computing device 102. User interface 500 may be generated by EC computing device 102 or otherwise made available to a registered user such as administrator 302 and/or recipient 402 such that the registered user may access app 502. In further embodiments, certain functionality performed by app 502 may be hosted by central server computing device 114, thereby enabling the registered user to access the functionality performed by app 502 in essentially the same or similar manner as if EC computing device 102 were executing app 502, as described elsewhere herein. In some embodiments, upon accessing app 502, user interface 500 may prompt the user to input their username and password to proceed.

Figure 6:
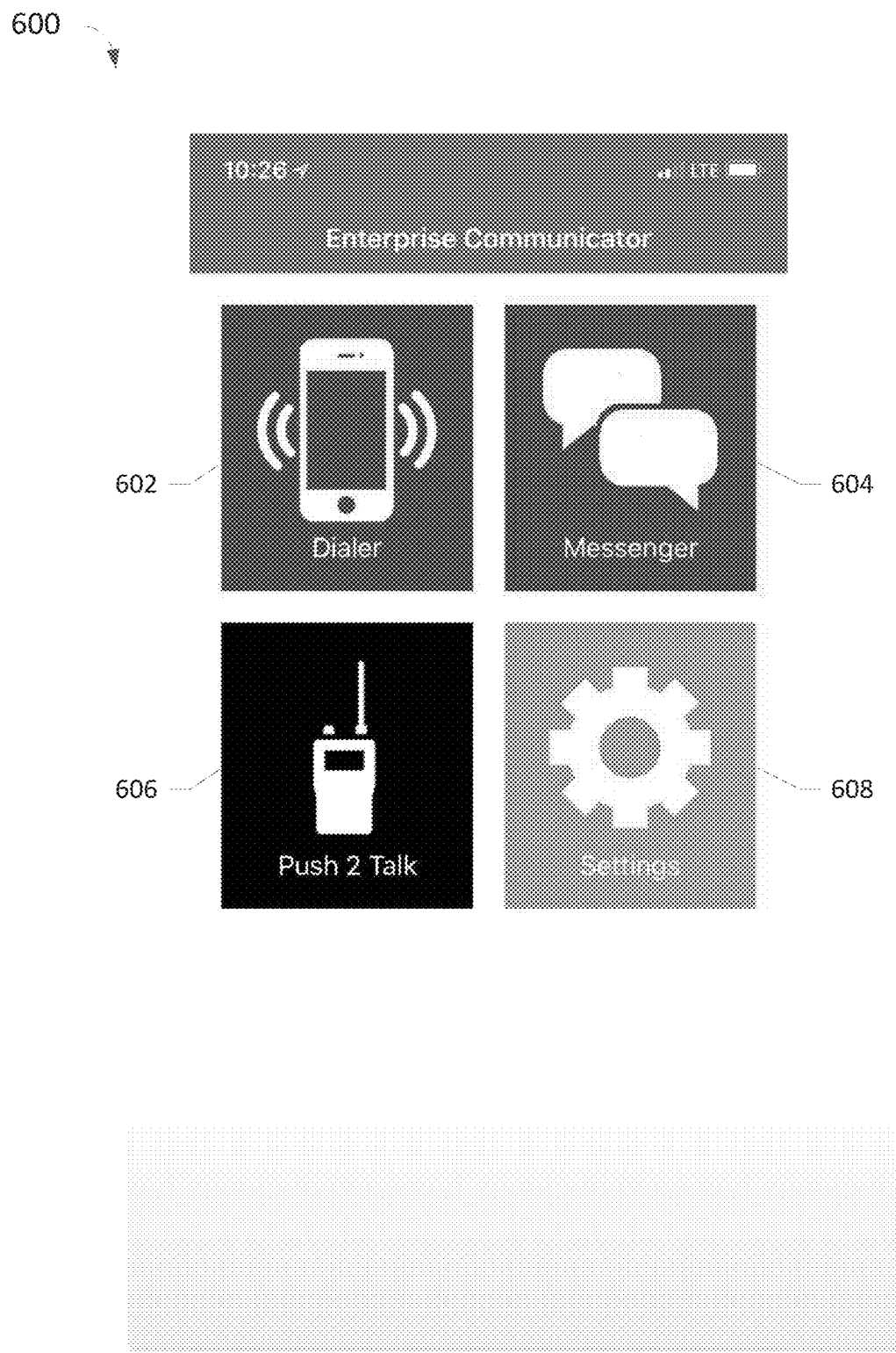
FIG. 6 illustrates an exemplary user interface for selecting a communication module by an administrator for a communication message, in accordance with one embodiment of the present disclosure.

FIG. 6 illustrates an exemplary user interface 600 for selecting a communication module, by administrator 302 (shown in FIG. 3), for a content message. In the exemplary embodiment, user interface 600 is generated for display on a user computing device associated with administrator 302. User interface 600 may be generated by EC computing device 102 or otherwise made available to administrator 302 such that administrator 302 may select a communication module for the content message. In the exemplary embodiment, user interface 600 includes a "dialer" icon 602 representative of a telephonic communication module, a "messenger" icon 604 representative of a messaging communication module, a "push 2 talk" icon 606 representative of a two-way radio communication module, and a "settings" icon 608 representative of a settings option to manage the features of app 502 (shown in FIG. 5). In the exemplary embodiment, administrator 302 may select one of "dialer" icon 602, "messenger" icon 604, or "push 2 talk" icon 606 to select a communication module for the content message. In further embodiments, certain functionality performed by app 502 may be hosted by central server computing device 114, thereby enabling administrator 302 to access the functionality performed by app 502 in essentially the same or similar manner as if EC computing device 102 were executing app 502, as described elsewhere herein.

User interface 600 differs from a response user interface (not shown) for enabling recipient 402 to select a communication module to respond to the content message. In these embodiments, the response user interface does not include "dialer" icon 602 because recipient 402 is not given permission to place outgoing calls. In these embodiments, the telephonic communication module may be provided to registered users having administrative authority, such as administrators 302. The response user interface may include icons corresponding to a messaging communication module and a two-way radio communication module. The response user interface may include a "received messages" icon (not shown) that enables recipient 402 (shown in FIG. 4) to access all messages sent to recipient 402. For example, recipient 402 may select the "received messages" icon to listen to an audio recording, such as a voicemail message, from administrator 302 to recipient 402.

Figure 7:
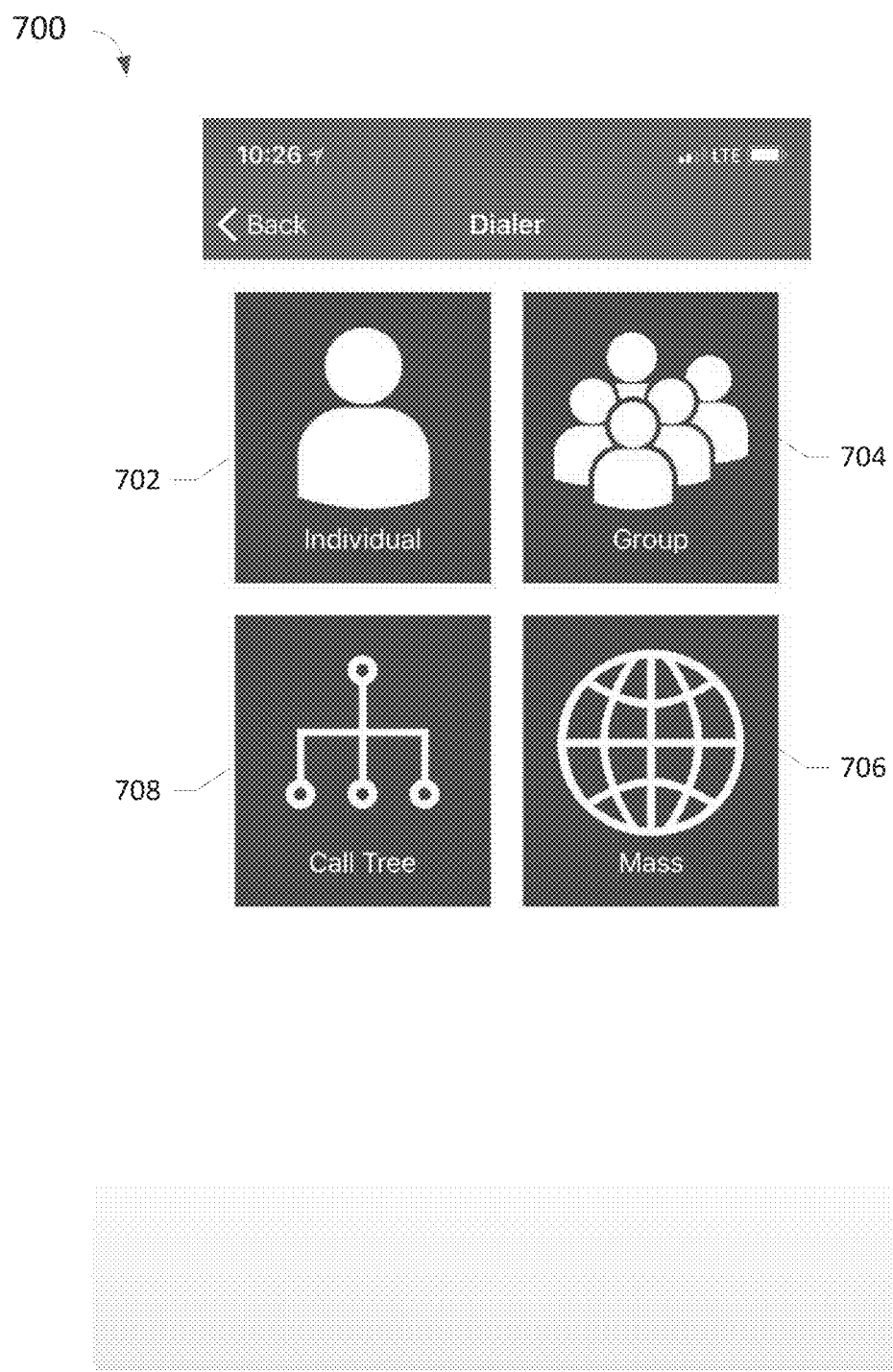
FIG. 7 illustrates an exemplary user interface for selecting a communication type by an administrator for a communication message, in accordance with one embodiment of the present disclosure.

FIG. 7 illustrates an exemplary user interface 700 for selecting a communication type, by administrator 302 (shown in FIG. 3), for a content message. In the exemplary embodiment, user interface 700 is generated for display on a user computing device associated with administrator 302. User interface 700 may be generated by EC computing device 102 or otherwise made available to administrator 302 such that administrator 302 may select a communication type associated with a previously-selected communication module (as shown in FIG. 6) for the content message. In the exemplary embodiment, user interface 700 includes a plurality of communication types specific to the telephonic communication module (as shown by "dialer" icon 602 in FIG. 6).

User interface 700 includes an "individual" icon 702 representative of communication with an individual recipient 402 (shown in FIG. 4), a "group" icon 704 representative of communication with a predefined group of recipients 402, a "mass" icon 706 representative of communication with a plurality of predefined groups (e.g., communication with every employee and/or policyholder registered with EC computing device 102), and a "call tree" icon 708 representative of communication with recipients 402 based upon specific hierarchical communication procedures.

Figure 8:
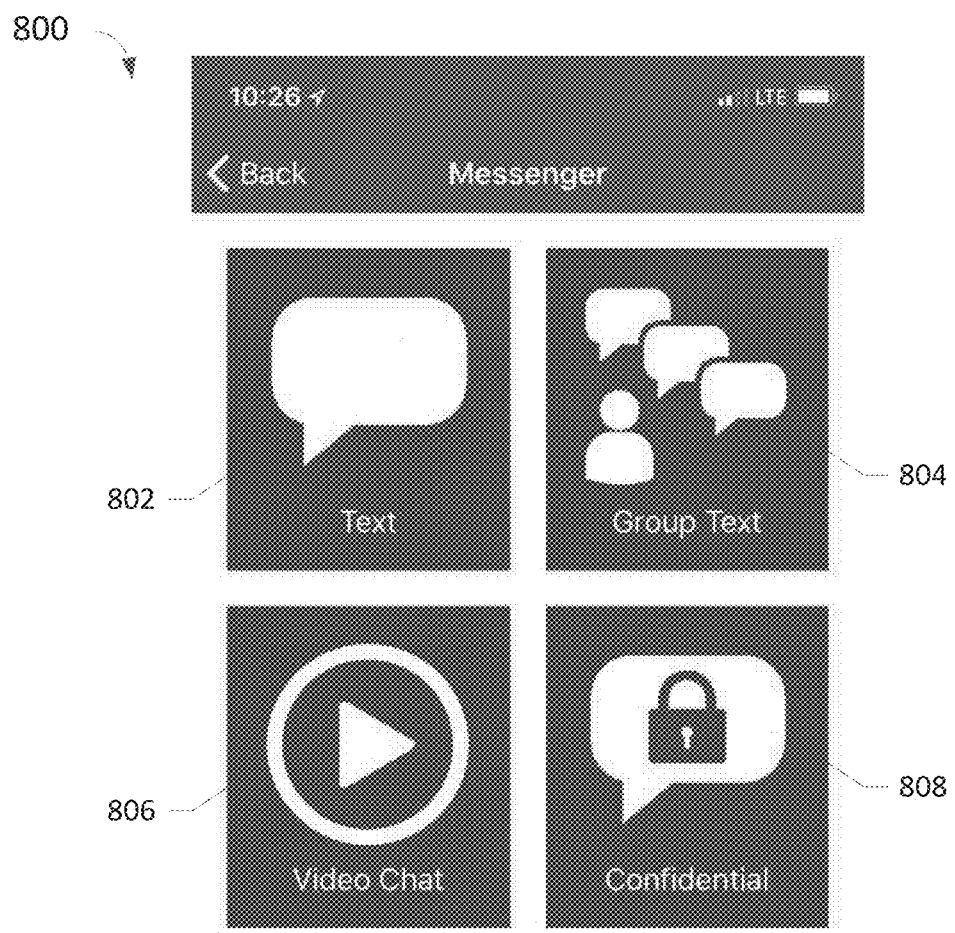
FIG. 8 illustrates another exemplary user interface for selecting a communication type by an administrator for a communication message, in accordance with one embodiment of the present disclosure.

FIG. 8 illustrates another exemplary user interface 800 for selecting a communication type, by administrator 302 (shown in FIG. 3), for a content message. In the exemplary embodiment, user interface 800 is generated for display on a user computing device associated with administrator 302. User interface 700 may be generated by EC computing device 102 or otherwise made available to administrator 302 such that administrator 302 may select a communication type associated with a previously-selected communication module (as shown in FIG. 6) for the content message. In the exemplary embodiment, user interface 800 includes a plurality of communication types specific to the messaging communication module (as shown by "messenger" icon 604 in FIG. 6).

User interface 800 includes a "text" icon 802 representative of text-based communication (e.g., cellular, Internet) with an individual recipient 402 (shown in FIG. 4), a "group text" icon 804 representative of text-based communication with a predefined group of recipients 402, a "video chat" icon 806 representative of communication via audio and/or video recordings, and a "confidential" icon 808 for any confidential information that is to be sent by administrator 302 in the content message. In one embodiment, administrator 302 may select "confidential" icon 808 to set a timer for a confidential message that is to be sent to recipients 402. For example, administrator 302 may set a period of time for the message, such that the message will disappear from recipient computing devices 104 (shown in FIG. 1) after the time period has elapsed. In another example, administrator 302 may select "confidential" icon 808 to make sure the confidential message disappears after recipient 402 opens the message. In these embodiments, the confidential message may be stored on central server computing device 114.

Figure 9:
FIG. 9 illustrates an exemplary user interface of a two-way radio communication between an administrator and a recipient via the two-way radio communication module.

FIG. 9 illustrates an exemplary user interface 900 of a two-way radio communication between administrator 302 (shown in FIG. 3) and recipient 402 (shown in FIG. 4) via the two-way radio communication module (as shown by "push 2 talk" icon 606 in FIG. 6). User interface 900 may be generated by EC computing device 102 or otherwise made available to administrator 302 and recipient 402. User interface 900 provides a visual indicator as to a conversation occurring in real time over, for example, a local radio frequency, between administrator 302 and recipient 402.

Figure 10:
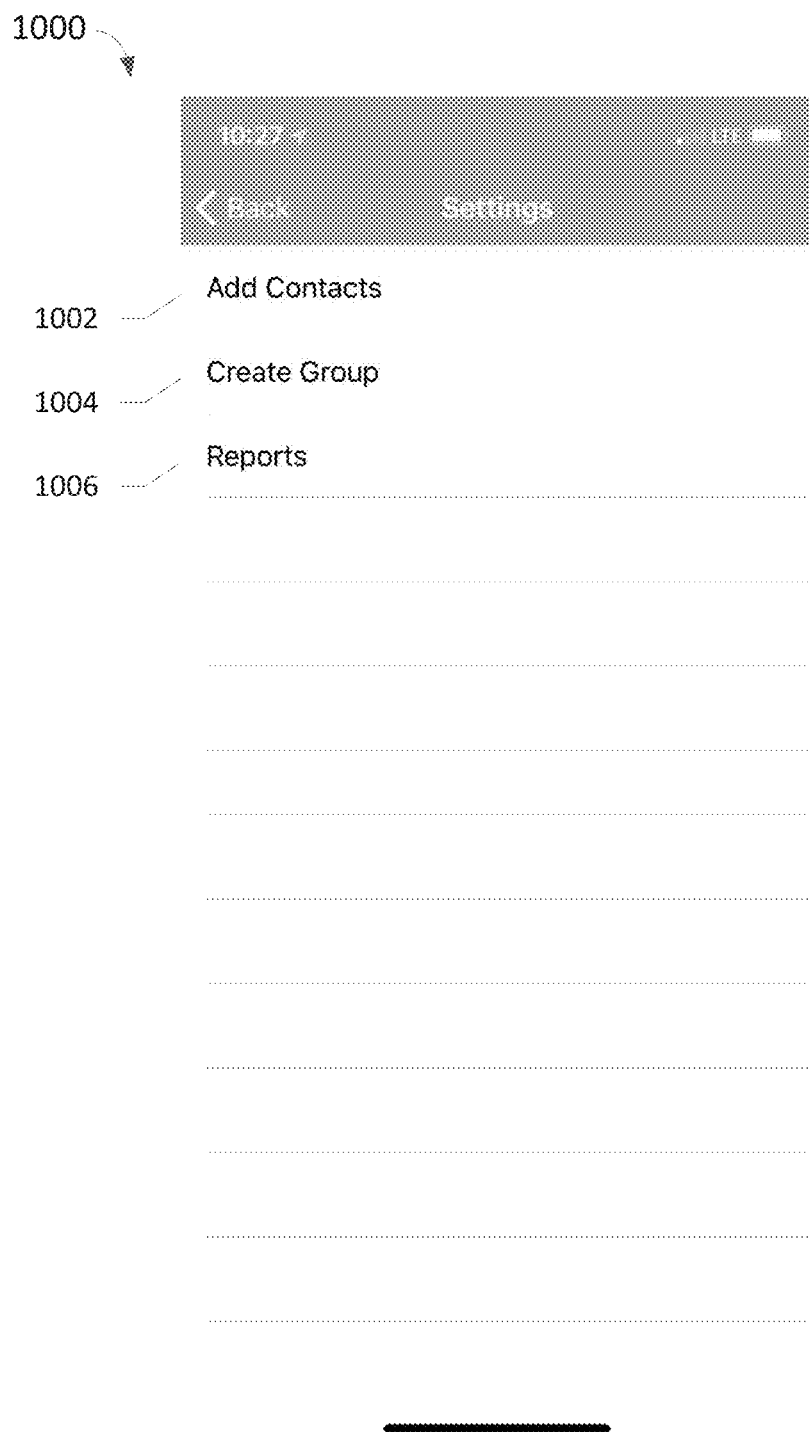
FIG. 10 illustrates an exemplary user interface for viewing settings associated with an app implementing enterprise communication functionality on the EC computing device.

FIG. 10 illustrates an exemplary user interface 1000 for viewing settings associated with app 502 (shown in FIG. 5). In the exemplary embodiment, user interface 1000 is displayed when a registered user select "settings" icon 608 (as shown in FIG. 6). User interface 1000 enables a registered user, such as administrator 302 (shown in FIG. 3) and/or recipient 402 (shown in FIG. 4) to add contacts (as shown by icon 1002), create groups (as shown by icon 1004), and/or access reports (as shown by icon 1006). User interface 1000 may be generated by EC computing device 102 or otherwise made available to a registered user such as administrator 302 and/or recipient 402 such that the registered user may access and adjust the functionalities and settings of app 502.

Exemplary Computer-Implemented Method for Enterprise Communication

Figure 11:
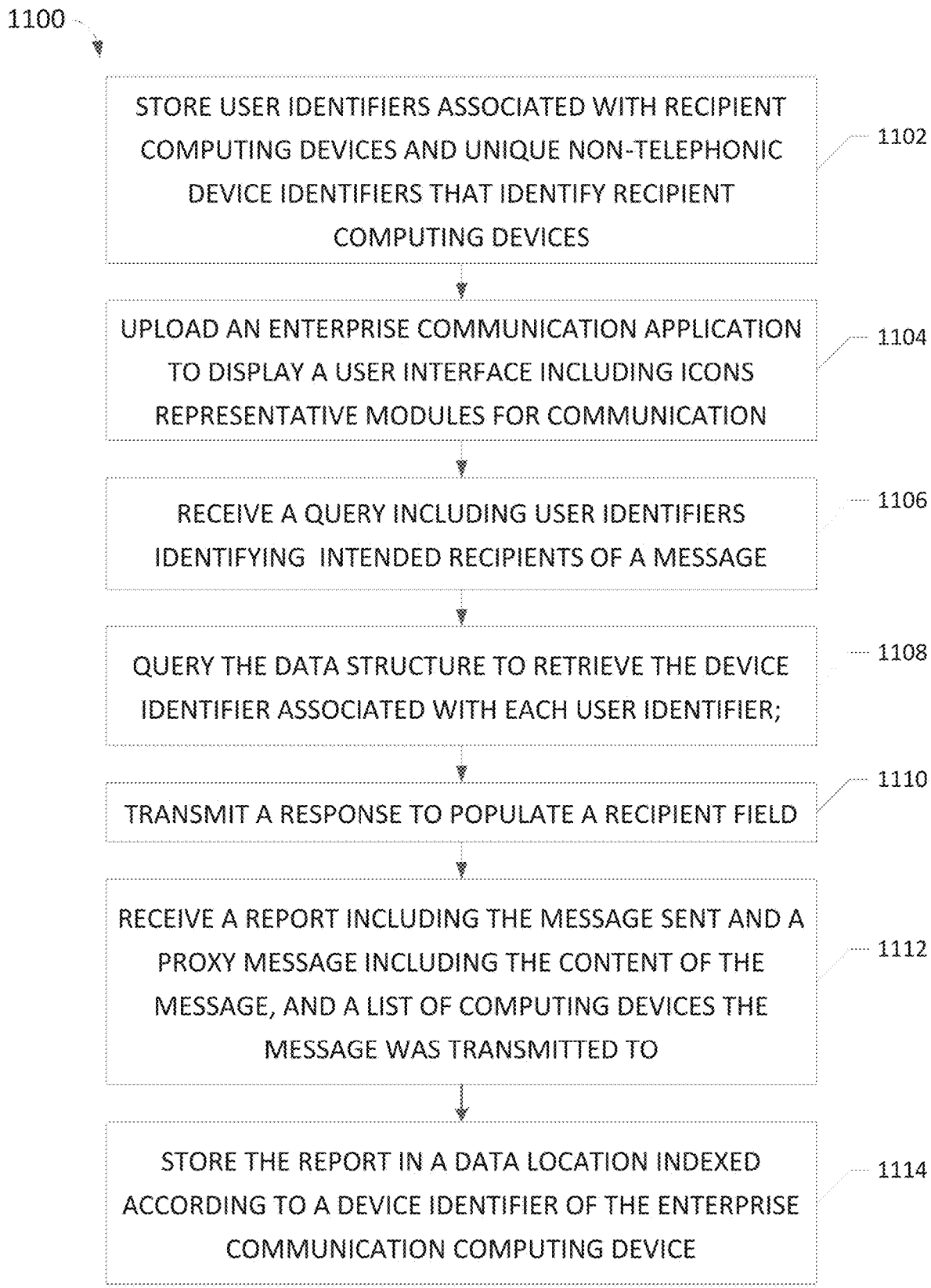
FIG. 11 illustrates a flowchart of an exemplary computer-implemented process implemented by the EC computing device enabling communication with recipient computing devices based upon unique, non-telephonic-based recipient computing device identifiers associated with each recipient computing device.

FIG. 11 illustrates a flowchart of an exemplary computer-implemented process 1100 implemented by EC computing device 102 enabling communication with a recipient computing device 104 based upon a unique, non-telephonic-based recipient computing device identifier associated with each recipient computing device (both shown in FIG. 1).

In the exemplary embodiment, process 1100 may include EC computing device 102 storing 1102, in a central data source (e.g. central server, shown in FIG. 1), a data structure associating a plurality of user identifiers with a plurality of user computing devices and associating each user computing device with a respective unique non-telephonic-based device identifier that uniquely identifies the associated recipient computing device 104. Process 1100 may also include uploading 1104, to EC computing device 102, an enterprise communication application, wherein execution of the enterprise communication application on EC computing device 102 causes EC computing device 102 to display a user interface including a plurality of icons, each icon representative of a respective communication interface module of a communication interface of EC computing device 102.

Process 1100 may further include receiving 1106, from EC computing device 102, a query including one or more user identifiers identifying respective one or more intended recipients of a message to be sent from EC computing device 102. Process 1100 may also include querying 1108 the data structure with the one or more user identifiers to retrieve the device identifier associated with each one or more user identifiers. Process 1100 may further include transmitting 1110, to EC computing device 102, a response including each retrieved device identifier, wherein receipt of the response populates a recipient field of the message to be sent with the retrieved device identifiers at EC computing device 102.

Process 1100 may include receiving, from EC computing device 102, in response to EC computing device 102 transmitting the message to each user computing device associated with one of the retrieved device identifiers, a first reporting message including (i) at least one of the messages sent by EC computing device 102 and a proxy message including at least a portion of content of the message, and (ii) a list of the one or more user computing devices to which the message was transmitted. Process 1100 may also include storing 1114, in the central data source, the first reporting message in a data location indexed according to a device identifier of EC computing device 102.

Figure 12:
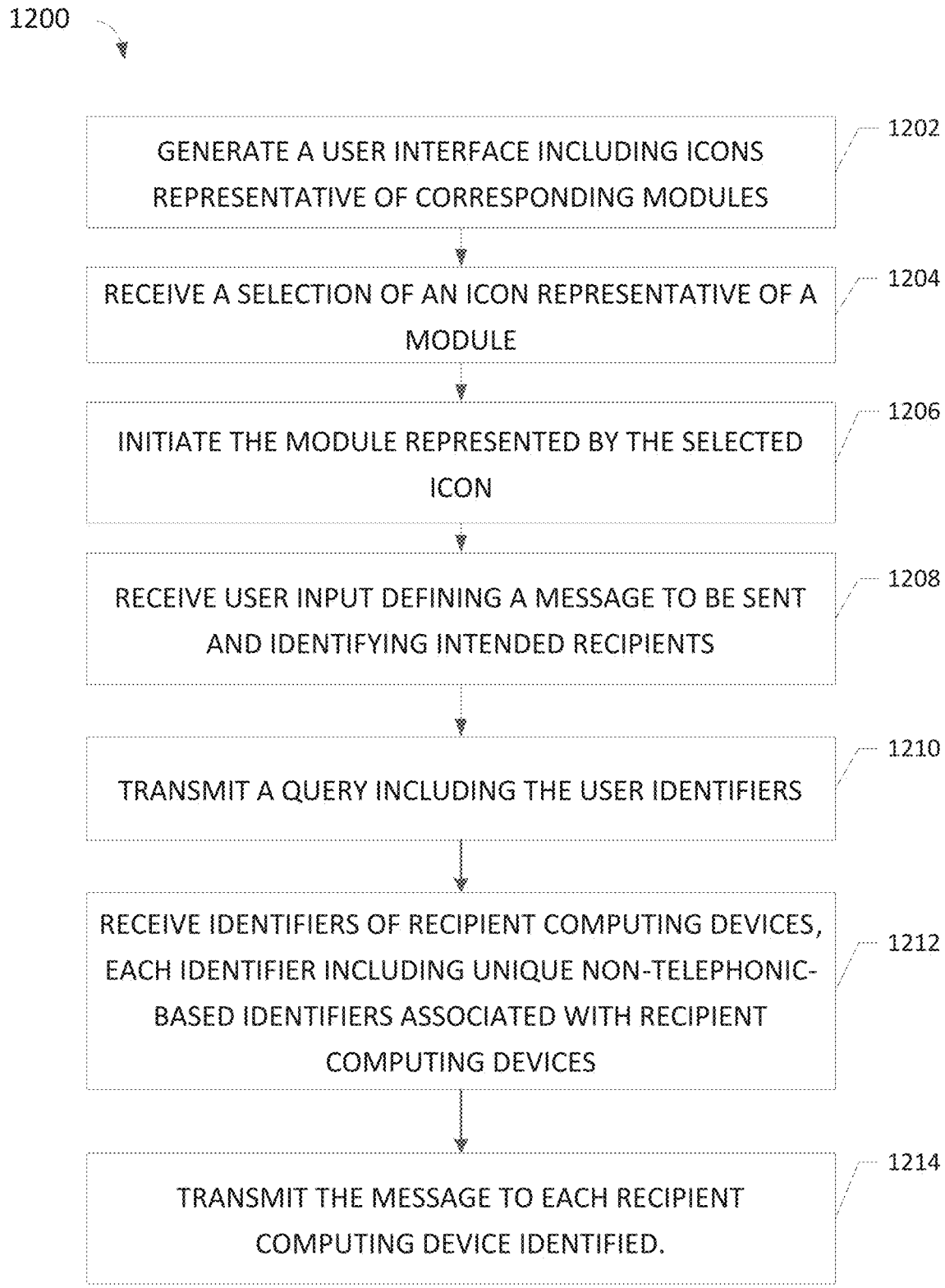
FIG. 12 illustrates a flowchart of an exemplary computer-implemented process implemented by the EC computing device enabling communication between the EC computing device and recipient computing devices based upon unique, non-telephonic-based recipient computing device identifiers associated with each recipient computing device.

Exemplary Computer-Implemented Method for Enterprise Communication with Multiple Modules FIG. 12 illustrates a flowchart of an exemplary computer-implemented process 1200 implemented by EC computing device 102 (shown in FIG. 1) enabling communication between EC computing device 102 and recipient computing devices 104 based upon a unique, non-telephonic-based recipient computing device identifier associated with each recipient computing device 104. EC computing device 102 may include a processor in communication with a memory device and a communication interface. The communication interface may include a plurality of modules including (i) a telephonic communication module for cellular telephonic communication with remote computing devices, (ii) a text-based messaging module for cellular text-based communication with remote computing devices, and (iii) a two-way radio communication module for two-way push-to-talk (PTT) communication with remote computing devices.

Process 1200 may include generating 1202 a user interface for execution on EC computing device 102, the user interface including a display with a plurality of icons, each icon representative of a corresponding module of the plurality of modules. Process 1200 may also include receiving 1204, from within the user interface executed on the EC computing device 102, a user selection of a first icon of the plurality of icons, the first icon representative of a first module of plurality of modules. Process 1200 may further include initiating 1206 the first module represented by the selected first icon. Process 1200 may also include receiving 1208 user input defining a message to be sent using the first module and including one or more user identifiers identifying a respective one or more intended recipients of the message to be sent.

Process 1200 may also include transmitting 1210, to a remote data source, a query including the one or more user identifiers. Process 1200 may further include receiving 1212, from the remote data source, one or more recipient computing device identifiers of a respective one or more recipient computing devices 104. Each recipient computing device 104 may be associated with a respective one of the intended recipients of the message to be sent. Each recipient identifier may include a unique non-telephonic-based identifier associated with respective recipient computing device 104. Process 1200 may also include transmitting 1214, via the first module, the message to each recipient computing device 104 identified based upon the received recipient computing device identifiers.

Exemplary Computer-Implemented Method for Responsive Enterprise Communication

Figure 13:
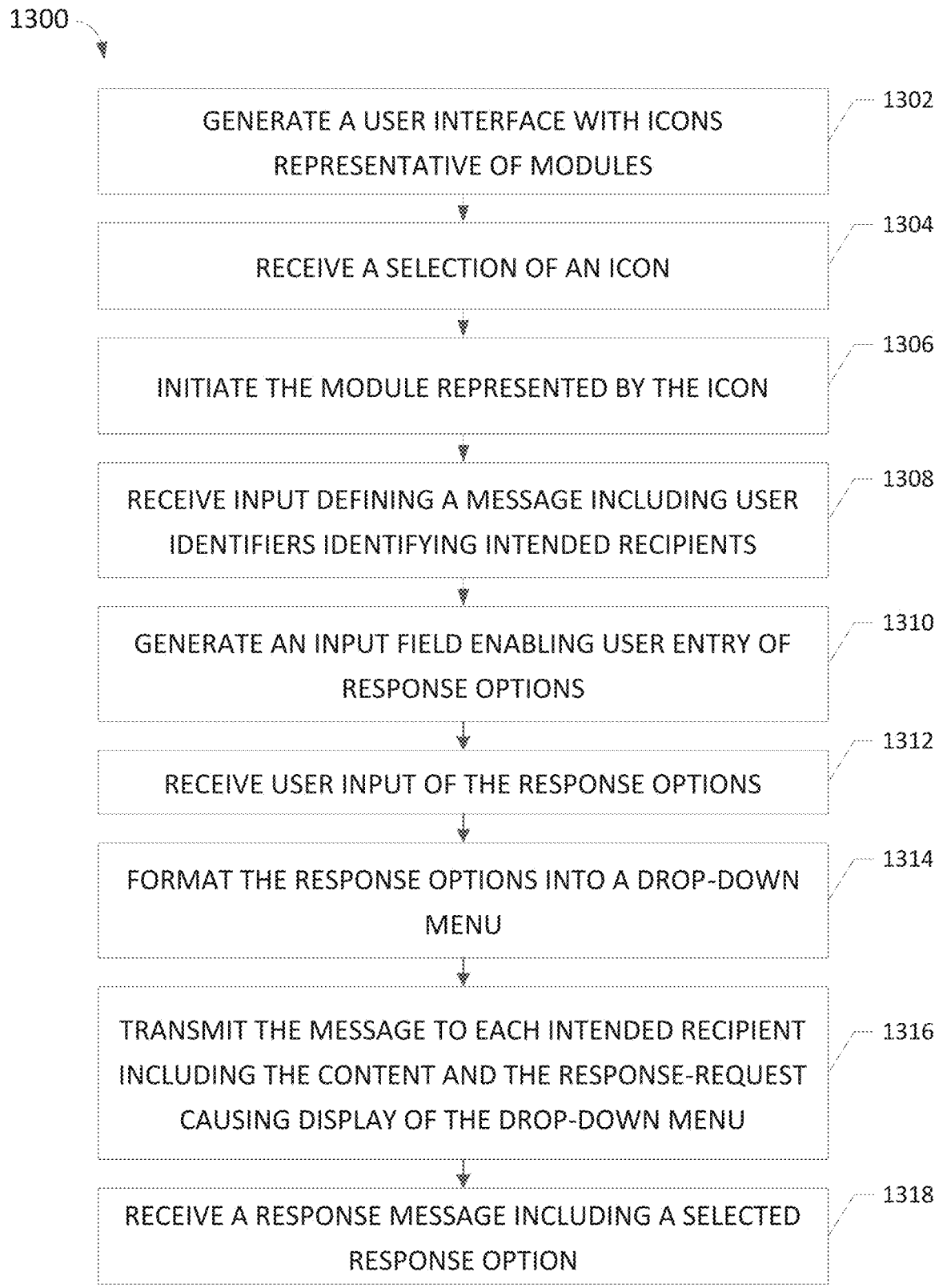
FIG. 13 illustrates a flowchart of an exemplary computer-implemented process implemented by the EC computing device.

FIG. 13 illustrates a flowchart of an exemplary computer-implemented process 1300 implemented by EC computing device 102 (shown in FIG. 1). EC computing device 102 may include a processor in communication with a memory device and a communication interface. The communication interface may include a plurality of modules including (i) a telephonic communication module for cellular telephonic communication with remote computing devices, and (ii) a text-based messaging module for cellular text-based communication with remote computing devices.

Process 1300 may include generating 1302 a user interface for execution on EC computing device 102, the user interface including a display with a plurality of icons, each icon representative of a corresponding module of the plurality of modules. Process 1300 may also include receiving 1304 from within the user interface executed on EC computing device 102, a user selection of a first icon of the plurality of icons, the first icon representative of a first module of plurality of modules.

Process 1300 may further include initiating 1306 the first module represented by the selected first icon. Process 1300 may also include receiving 1308 user input defining a content message to be sent using the first module and including one or more user identifiers identifying a respective one or more intended recipients of the content message to be sent. Process 1300 may further include generating 1310 an input field enabling user entry of a plurality of response options, each response option responsive to content of the content message to be sent. Process 1300 may also include receiving 1312 user input of the plurality of response options.

Process 1300 may further include formatting 1314 the plurality of response options to generate a response-request portion of the content message to be sent including the plurality of response options in a drop-down menu. Process 1300 may also include transmitting 1316 via the first module, the content message to a respective recipient computing device 104 (shown in FIG. 1) associated with each intended recipient. The content message may include the content and the response-request portion. Receipt of the content message at recipient computing device 104 may cause the recipient computing device 104 to display the drop-down menu including the plurality of response options within a respective user interface of recipient computing device 104. Process 1300 may further include receiving 1318 from one or more of the recipient computing devices 104, a response message including a selected response option from the plurality of response options.

Exemplary Enterprise Communication Computing Device

Figure 14:
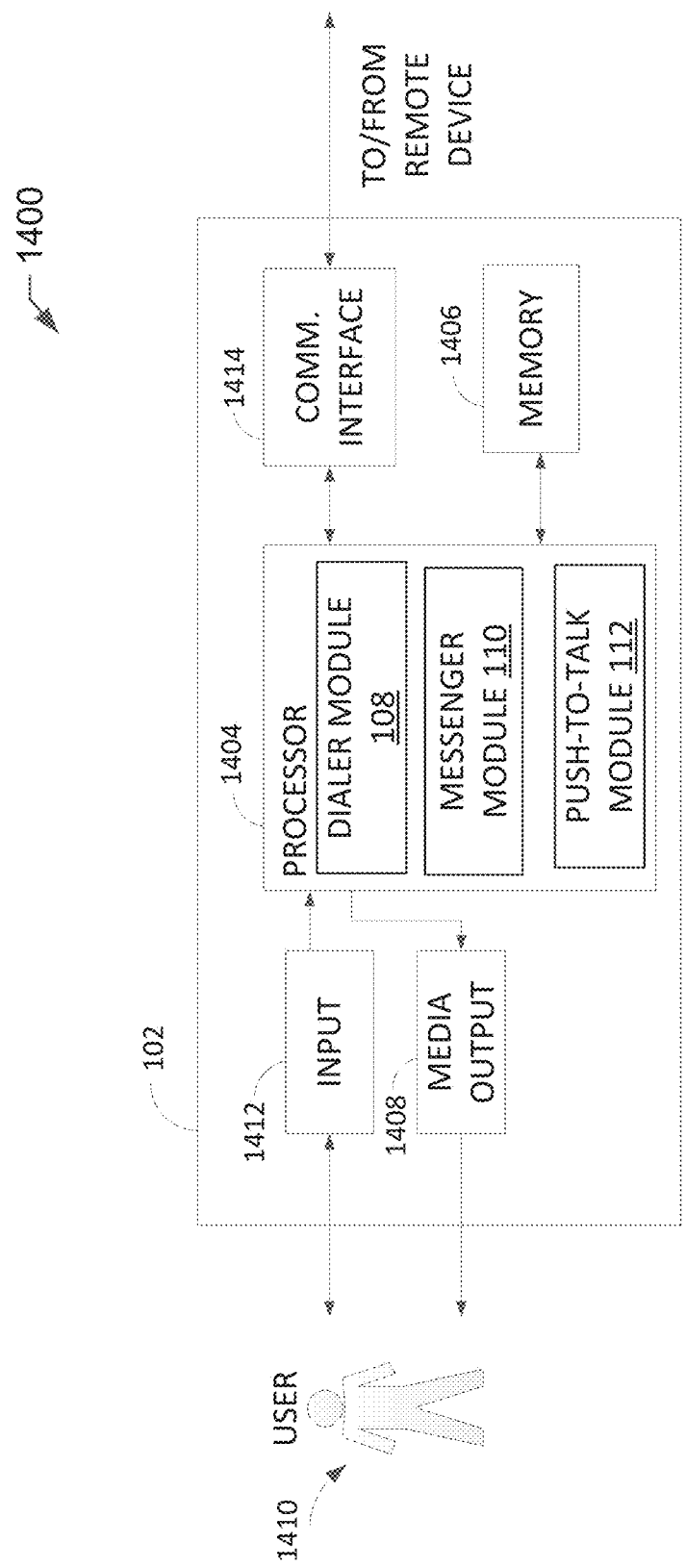
FIG. 14 illustrates an exemplary configuration of the EC computing device in accordance with one embodiment of the present disclosure.

FIG. 14 illustrates an exemplary configuration 1400 of EC computing device 102 (shown in FIG. 1) in accordance with one embodiment of the present disclosure. EC computing device 102 may include a processor 1404 for executing instructions. In some embodiments, executable instructions may be stored in a memory area 1406. Processor 1404 may include one or more processing units (e.g., in a multi-core configuration).

In the exemplary embodiment, processor 1404 is operable to execute dialer module 108, messenger module 110, and push-to-talk module 112. Modules 108, 110, and 112 may include specialized instruction sets, and/or coprocessors. Dialer module 108 may be configured to initiate telephonic communication between administrator 302 (shown in FIG. 3) and one or more recipients 402 (shown in FIG. 4). Messenger module 110 may be configured to transmit messages between administrator 302 and one or more recipients 402. Push-to-talk module 112 may be configured to enable administrator 302 and one or more recipients 402 to communicate with one another via a local radio frequency in real time. Memory area 1406 may be any device allowing information such as executable instructions and/or other data to be stored and retrieved. Memory area 1406 may include one or more computer readable media.

In exemplary embodiments, EC computing device 102 may also include at least one media output component 1408 for presenting information to a user 1410, such as administrator 302. Media output component 1408 may be any component capable of conveying information to user 1410. In some embodiments, media output component 1408 may include an output adapter such as a video adapter and/or an audio adapter. An output adapter may be operatively coupled to processor 1404 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

EC computing device 102 may also include an input device 1412 for receiving input from user 1410. Input device 1412 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 1408 and input device 1412.

EC computing device 102 may also include a communication interface 1414, which can be communicatively coupled to a remote device, such as central server computing device 114 (shown in FIG. 1). Communication interface 1414 may include, for example, a wired or wireless network adapter or a wireless data transceiver for use with a mobile phone network (e.g., Global System for Mobile communications (GSM), 3G, 4G or BLUETOOTH™) or other mobile data network (e.g., Worldwide Interoperability for Microwave Access (WIMAX)).

Stored in memory area 1406 may be, for example, computer readable instructions for providing a user interface to user 1410 via media output component 1408 and, optionally, receiving and processing input from input device 1412. A user interface may include, among other possibilities, a web browser and client application. Web browsers may enable users, such as user 1410, to display and interact with media and other information typically embedded on a web page or a website. A client application may allow user 1410, such as recipient 402, to interact with an application associated with EC computing device 102, such as app 502 (shown in FIG. 5).

Memory area 1406 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Central Server Computing Device

Figure 15:
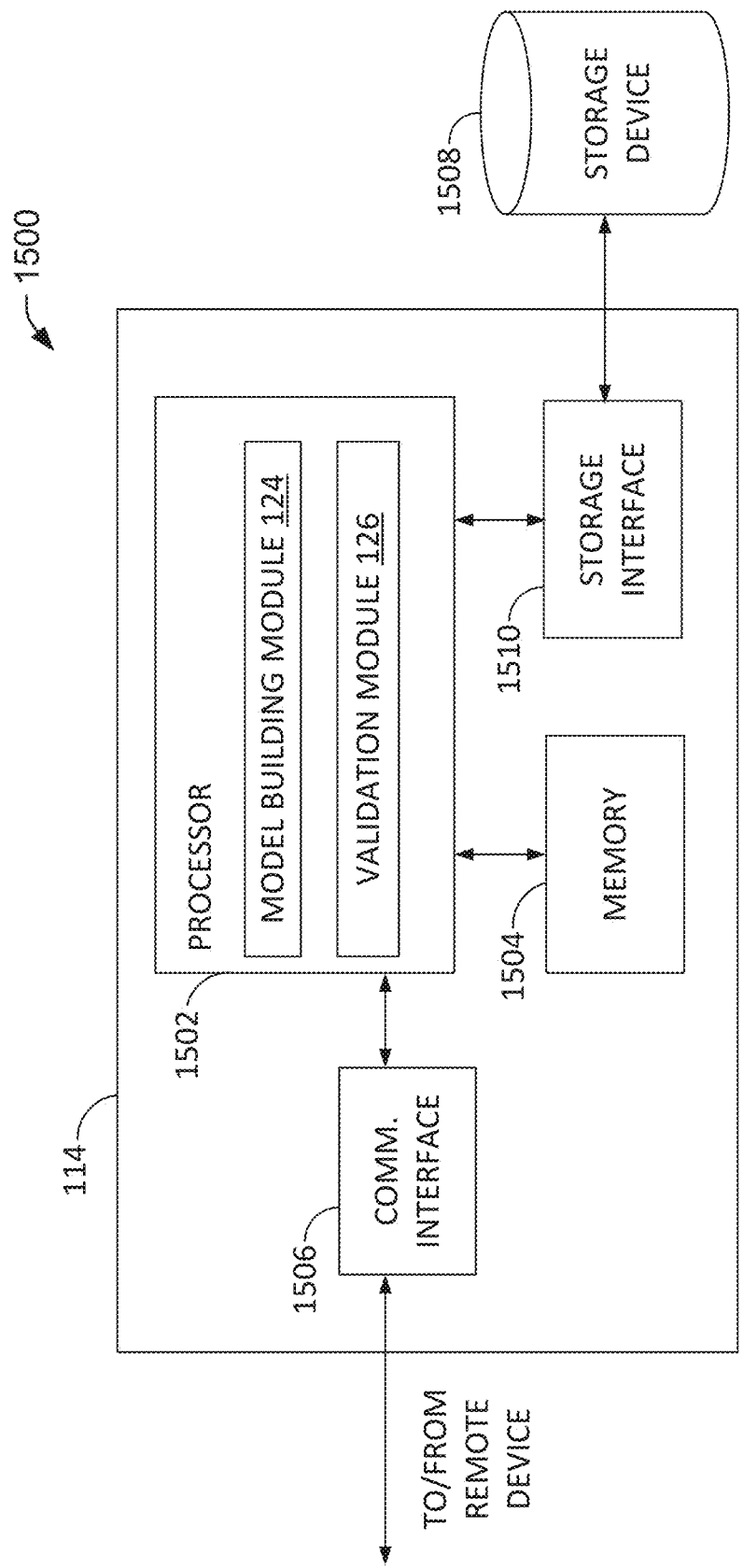
FIG. 15 depicts an exemplary configuration of a central server computing device in accordance with one embodiment of the present disclosure.

FIG. 15 depicts an exemplary configuration 1500 of central server computing device 114 (shown in FIG. 1) in accordance with one embodiment of the present disclosure. Central server computing device 114 includes a processor 1502 for executing instructions. Instructions are stored in a memory area 1504, for example. Processor 1502 includes one or more processing units (e.g., in a multi-core configuration).

In the exemplary embodiment, processor 1502 is operable to execute model building module 124 and validation module 126. Modules 124 and 126 may include specialized instruction sets and/or coprocessors. Model building module 124 may be utilized to build models that utilize artificial intelligence algorithms to provide real time supporting information that is relevant and pertinent to recipients 402 of a specific message. For example, central server computing device 114 may utilize model building module 124 to build models that generate and transmit supplemental (e.g., supporting) messages to recipients 402 in real time. For example, for a hurricane evacuation message, central server computing device 114 may utilize a model that automatically generates a list of resources and websites to follow up on the hurricane evacuation message. In this example, recipients 402 of the hurricane evacuation message may receive a follow up message that provides names of shelters, a list of supplies related to hurricanes, procedures on locating one's claim record or finding an insurance adjuster, and/or safety tips and precautions associated with a hurricane.

Validation module 126 may be utilized to perform validation steps and confirm that intended recipients 402 of a content message remain opted in to enterprise communication system 100 (shown in FIG. 1). For example, if administrator 302 is attempting to send a message to a group of policyholders, central server computing device 114 may utilize validation module 126 to verify that each recipient 402 of the group is still a valid policyholder. Validation module 126 may enable central server computing device 114 to double check that intended recipients 402 want to receive messages from EC computing device 102 before each message is sent. In doing so, central server computing device 114 may automatically avoid transmitting content messages to those who have opted out of enterprise communication system 100, and do not wish to receive content messages.

In the exemplary embodiment, processor 1502 is operatively coupled to a communication interface 1506 such that central server computing device 114 is capable of communicating with remote device(s) such as recipient computing devices 104 (shown in FIG. 1). Processor 1502 may also be operatively coupled to a storage device 1508. Storage device 1508 may be any computer-operated hardware suitable for storing and/or retrieving data. In some embodiments, storage device 1508 may be integrated in central server computing device 114. For example, central server computing device 114 may include one or more hard disk drives as storage device 1508. In other embodiments, storage device 1508 is external to central server computing device 114 and is accessed by a plurality of computer devices. For example, storage device 1508 may include a storage area network (SAN), a network attached storage (NAS) system, and/or multiple storage units such as hard disks and/or solid state disks in a redundant array of inexpensive disks (RAID) configuration.

In some embodiments, processor 1502 may be operatively coupled to storage device 1508 via a storage interface 1510. Storage interface 1510 may be any component capable of providing processor 1502 with access to storage device 1508. Storage interface 1510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1502 with access to storage device 1508.

Processor 1502 may execute computer-executable instructions for implementing aspects of the disclosure. In some embodiments, processor 1502 may be transformed into a special purpose microprocessor by executing computer-executable instructions or by otherwise being programmed. For example, processor 1502 may be programmed with the instruction such as those illustrated in FIGS. 11, 12, and 13.

Memory areas 1504 and 116 (shown in FIG. 1) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Embodiments & Functionality

In one aspect, an enterprise communication computing device including a processor in communication with a memory device and a communication interface may be provided. The communication interface includes a plurality of modules including a telephonic communication module for cellular telephonic communication with remote computing devices. The communication interface also includes a text-based messaging module for cellular text-based communication with remote computing devices. The communication interface further includes a two-way radio communication module for two-way push-to-talk (PTT) communication with remote computing devices.

The processor may be programmed to (i) generate a user interface for execution on the enterprise communication computing device, the user interface including a display with a plurality of icons, each icon representative of a corresponding module of the plurality of modules, (ii) receive, from within the user interface executed on the enterprise communication computing device, a user selection of a first icon of the plurality of icons, the first icon representative of a first module of plurality of modules, (iii) execute the first module represented by the selected first icon, (iv) receive user input defining a message to be sent using the first module and including one or more user identifiers identifying a respective one or more intended recipients of the message to be sent, (v) transmit, to a remote data source, a query including the one or more user identifiers, (vi) receive, from the remote data source, one or more recipient computing device identifiers of a respective one or more recipient computing devices, each recipient computing device associated with a respective one of the intended recipients of the message to be sent, wherein each recipient identifier includes a unique non-telephonic-based identifier associated with the respective recipient computing device, and (vii) transmit, via the first module, the message to each recipient computing device identified based upon the received recipient computing device identifiers.

One enhancement may be where the processor is further programmed to transmit, to the remote data source, a first reporting message including (i) at least one of the messages and a proxy message including at least a portion of content of the message, and (ii) a list of the one or more recipient computing devices to which the message was transmitted, wherein receipt of the first reporting message causes the remote data source to store the first reporting message in a data location indexed according to an identifier of the enterprise communication computing device.

Another enhancement may be where the processor is further programmed to receive, from at least one recipient computing device to which the message was transmitted, a status message including a status indicator indicating whether the message was delivered to the respective intended recipient associated with the at least one recipient computing device and transmit, to the remote data source, a second reporting message including the list of the one or more recipient computing devices and the associated status indicator for the at least one recipient computing device, wherein receipt of the second reporting message causes the remote data source to retrieve the first reporting message and update the stored first reporting message with the status indicators.

Another enhancement may be where the processor is further programmed to download, from the remote data source, an enterprise communication application and generate the user interface, execute the enterprise communication application. A further enhancement may be where the processor is further programmed to, upon a first execution of the enterprise communication application, receive user input indicating user consent from a user of the enterprise communication computing device to transmit and receive messages.

Another enhancement may be where the first icon includes an icon representative of the telephonic communication module, where, to execute the first module, said processor is further programmed to execute the telephonic communication module, where the message to be sent includes a telephonic communication with the one or more intended recipients, and where to transmit the message to each recipient computing device, said processor is further programmed to initiate a cellular telephonic communication with each recipient computing device over a cellular telephone network.

Another enhancement may be where the first icon includes an icon representative of the text-based messaging module, where, to execute the first module, said processor is further programmed to execute the text-based messaging module, where the message to be sent includes text-based content, and where to transmit the message to each recipient computing device, said processor is further programmed to transmit a cellular message including the text-based content to each recipient computing device over a cellular network.

A further enhancement may be where the first icon includes an icon representative of the two-way radio communication module, where, to execute the first module, said processor is further programmed to execute the two-way radio communication module, and where, to transmit the message to each recipient computing device, said processor is further programmed to initiate a radio-based, two-way PTT communication with each recipient computing device over one of a cellular telephone network, a radio network, and a cellular data network.

In another aspect, a computer-implemented method of enabling communication between an enterprise communication computing device and recipient computing devices may be provided. The communication may be based upon a unique, non-telephonic-based recipient computing device identifier associated with each recipient computing device. The method may be implemented using a centralized server computing device. The method may comprise: (i) storing, in a central data source, a data structure associating a plurality of user identifiers with a plurality of user computing devices and associating each user computing device with a respective unique non-telephonic-based device identifier that uniquely identifies the associated recipient computing device, (ii) uploading, to an enterprise communication computing device, an enterprise communication application, wherein execution of the enterprise communication application on the enterprise communication computing device causes the enterprise communication computing device to display a user interface including a plurality of icons, each icon representative of a respective communication interface module of a communication interface of the enterprise communication computing device, (iii) receiving, from the enterprise communication computing device, a query including one or more user identifiers identifying respective one or more intended recipients of a message to be sent from the enterprise communication computing device, (iv) querying the data structure with the one or more user identifiers to retrieve the device identifier associated with each one or more user identifiers, (v) transmitting, to the enterprise communication computing device, a response including each retrieved device identifier, wherein receipt of the response populates a recipient field of the message to be sent with the retrieved device identifiers at the enterprise communication computing device, (vi) receiving, from the enterprise communication computing device, in response to the enterprise communication computing device transmitting the message to each user computing device associated with one of the retrieved device identifiers, a first reporting message including (a) at least one of the message sent by the enterprise communication computing device and a proxy message including at least a portion of content of the message, and (b) a list of the one or more user computing devices to which the message was transmitted, and/or (vii) storing, in the central data source, the first reporting message in a data location indexed according to a device identifier of the enterprise communication computing device.

One enhancement may be where the method further comprises: (i) receiving, from the enterprise communication computing device, a second reporting message including the list of the one or more user computing devices and an associated status indicator for the one or more user computing devices, each status indicator indicating whether the message was delivered to the respective intended recipient associated with each user computing device, (ii) querying the central data source using the device identifier of the enterprise communication computing device to retrieve, from the central data source, the first reporting message, and/or (iii) storing, in the central data source, the updated first reporting message as an updated reporting message that overwrites the stored first reporting message.

Another enhancement may be where the method further comprises: (i) uploading, to each user computing device, the enterprise communication application, (ii) receiving, upon a first execution of the enterprise communication application at each user computing device, a consent message including indicating user consent from the respective user of the user computing device to transmit and receive messages at the user computing device, and/or (iii) storing, in the data structure, a data element associated with each user computing device that indicates the user computing device is available to transmit and receive message.

Another enhancement may be where the method further comprises: (i) receiving, from the enterprise communication computing device, a request message including the intended recipients of the message, the request message instructing the centralized server computing device to create a group including the intended recipients of the message, the request message further including a group identifier associated with the group, (ii) modify the stored data structure to include the group identifier, the data structure storing the group identifier and associating the group identifier with a group of device identifiers including every device identifier respectively associated with each intended recipient of the message, and/or (iii) in response to receiving a query including the group identifier from the enterprise communication computing device, transmitting, to the enterprise communication computing device, a group response including the group of device identifiers, wherein receipt of the group response populates a recipient field of a group message to be sent with the group of device identifiers at the enterprise communication computing device.

In yet another aspect, a method of enabling communication between an enterprise communication computing device and recipient computing devices may be provided. The communication may be based upon a unique, non-telephonic-based recipient computing device identifier associated with each recipient computing device. The method may be implemented by the enterprise communication computing device including a processor in communication with a memory device and a communication interface. The communication interface may include a plurality of modules including (i) a telephonic communication module for cellular telephonic communication with remote computing devices, (ii) a text-based messaging module for cellular text-based communication with remote computing devices, and (iii) a two-way radio communication module for two-way push-to-talk (PTT) communication with remote computing devices.

The method may comprise: (i) generating a user interface for execution on the enterprise communication computing device, the user interface including a display with a plurality of icons, each icon representative of a corresponding module of the plurality of modules, (ii) receiving, from within the user interface executed on the enterprise communication computing device, a user selection of a first icon of the plurality of icons, the first icon representative of a first module of plurality of modules, (iii) executing the first module represented by the selected first icon, (iv) receiving user input defining a message to be sent using the first module and including one or more user identifiers identifying respective one or more intended recipients of the message to be sent, (v) transmitting, to a remote data source, a query including the one or more user identifiers, (vi) receiving, from the remote data source, one or more recipient computing device identifiers of a respective one or more recipient computing devices, each recipient computing device associated with a respective one of the intended recipients of the message to be sent, wherein each recipient identifier includes a unique non-telephonic-based identifier associated with the respective recipient computing device, and/or (vii) transmitting, via the first module, the message to each recipient computing device identified based upon the received recipient computing device identifiers.

One enhancement may be where the method further comprises transmitting, to the remote data source, a first reporting message including (i) at least one of the message and a proxy message including at least a portion of content of the message, and/or (ii) a list of the one or more recipient computing devices to which the message was transmitted, wherein receipt of the first reporting message causes the remote data source to store the first reporting message in a data location indexed according to an identifier of the enterprise communication computing device.

Another enhancement may be where the method further comprises (i) receiving, from at least one recipient computing device to which the message was transmitted, a status message including a status indicator indicating whether the message was delivered to the respective intended recipient associated with the at least one recipient computing device, and/or (ii) transmitting, to the remote data source, a second reporting message including the list of the one or more recipient computing devices and the associated status indicator for the at least one recipient computing device, wherein receipt of the second reporting message causes the remote data source to retrieve the first reporting message and update the stored first reporting message with the status indicators.

Another enhancement may be where the method further comprises downloading, from the remote data source, an enterprise communication application, where generating the user interface may comprise executing the enterprise communication application. A further embodiment may be where the method also comprises, upon a first time executing the enterprise communication application, receiving user input indicating user consent from a user of the enterprise communication computing device to transmit and receive messages.

Another enhancement may be where the first icon includes an icon representative of the telephonic communication module. Another embodiment may be where executing the first module comprises executing the telephonic communication module. Another embodiment may be where the message to be sent includes a telephonic communication with the one or more intended recipients. A further embodiment may be where transmitting the message to each recipient computing device comprises initiating a cellular telephonic communication with each recipient computing device over a cellular telephone network.

Another further enhancement may be where (i) the first icon includes an icon representative of the text-based messaging module, (ii) the message to be sent includes text-based content, and/or (iii) transmitting the message to each recipient computing device comprises transmitting a cellular message including the text-based content to each recipient computing device over a cellular network.

Another enhancement may be where (i) executing the first module comprises executing the two-way radio communication module, (ii) the message to be sent includes a radio-based PTT communication with the one or more intended recipients, and/or (iii) transmitting the message to each recipient computing device comprises initiating a radio-based, two-way PTT communication with each recipient computing device over one of a cellular telephone network, a radio network, and a cellular data network.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as image data of objects to be analyzed, intelligent telematics data, mobile device data, and/or vehicle telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning. Updated data may feed back into the machine learning programs in real-time to update its set of parameters.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or objectoriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An enterprise communication computing device enabling communication with recipient computing devices based upon a unique, non-telephonic-based recipient computing device identifier associated with each recipient computing device, the enterprise communication computing device comprising a processor in communication with a memory device and a communication interface, wherein said communication interface comprises a plurality of modules comprising:

a telephonic communication module for cellular telephonic communication with remote computing devices;

a text-based messaging module for cellular text-based communication with remote computing devices; and a two-way radio communication module for two-way push-to-talk (PTT) communication with remote computing devices, wherein said processor is programmed to:

generate a user interface for execution on the enterprise communication computing device, the user interface including a display with a plurality of icons, each icon representative of a corresponding module of the plurality of modules;

receive, from within the user interface executed on the enterprise communication computing device, a user selection of a first icon of the plurality of icons, the first icon representative of a first module of plurality of modules;

execute the first module represented by the selected first icon;

receive, via the first module executed on the enterprise communication computing device, user input defining a message to be sent using the first module and including a plurality of user identifiers identifying a respective plurality of intended recipients of the message to be sent;

transmit, to a remote data source, a query including the plurality of user identifiers and a request for validation of the plurality of user identifiers;

receive, from the remote data source, a subset of a plurality of recipient computing device identifiers of a respective plurality of recipient computing devices, each recipient computing device associated with a respective one of the intended recipients of the message to be sent, wherein each recipient identifier includes a unique non-telephonic-based identifier associated with the respective recipient computing device, wherein the same recipient identifier is used to communicate with the respective recipient computing device using each of the plurality of modules, and wherein only the subset of the plurality of recipient computing device identifiers of a respective subset of the plurality of recipient computing devices associated with respective ones of a validated subset of the plurality of user identifiers are received; and transmit in real-time, via the first module, the message to the plurality of recipient computing devices identified based upon the received recipient computing device identifiers.

2. The enterprise communication computing device of claim 1, wherein said processor is further programmed to:

transmit, to the remote data source, a first reporting message including (i) at least one of the message and a proxy message including at least a portion of content of the message, and (ii) a list of the plurality of recipient computing devices to which the message was transmitted, wherein receipt of the first reporting message causes the remote data source to store the first reporting message in a data location indexed according to an identifier of the enterprise communication computing device.

3. The enterprise communication computing device of claim 2, wherein said processor is further programmed to:

receive, from at least one recipient computing device to which the message was transmitted, a status message including a status indicator indicating whether the message was delivered to the respective intended recipient associated with the at least one recipient computing device; and transmit, to the remote data source, a second reporting message including the list of the one or more recipient computing devices and the associated status indicator for the at least one recipient computing device, wherein receipt of the second reporting message causes the remote data source to retrieve the first reporting message and update the stored first reporting message with the status indicators.

4. The enterprise communication computing device of claim 1, wherein said processor is further programmed to:

download, from the remote data source, an enterprise communication application; and generate the user interface in response to execution of the enterprise communication application.

5. The enterprise communication computing device of claim 4, wherein said processor is further programmed to:

upon a first execution of the enterprise communication application, receive user input indicating user consent from a user of the enterprise communication computing device to transmit and receive messages.

6. The enterprise communication computing device of claim 1, wherein the first icon includes an icon representative of the telephonic communication module, wherein to execute the first module, said processor is further programmed to execute the telephonic communication module, wherein the message to be sent includes a telephonic communication with the plurality of intended recipients, and wherein to transmit the message to the plurality of recipient computing devices, said processor is further programmed to initiate a cellular telephonic communication with each of the plurality of recipient computing devices over a cellular telephone network.

7. The enterprise communication computing device of claim 1, wherein the first icon includes an icon representative of the text-based messaging module, wherein to execute the first module, said processor is further programmed to execute the text-based messaging module, wherein the message to be sent includes text-based content, and wherein to transmit the message to the plurality of recipient computing devices, said processor is further programmed to transmit a cellular message including the text-based content to the plurality of recipient computing devices over a cellular network.

8. The enterprise communication computing device of claim 1, wherein the first icon includes an icon representative of the two-way radio communication module, wherein to execute the first module, said processor is further programmed to execute the two-way radio communication module, wherein the message to be sent includes a radio-based PTT communication with the plurality of intended recipients, and wherein to transmit the message to the plurality of recipient computing devices, said processor is further programmed to initiate a radio-based, two-way PTT communication with each of the plurality of recipient computing devices over one of a cellular telephone network, a radio network, and a cellular data network.

9. A method of enabling communication between an enterprise communication computing device and a plurality of recipient computing devices based upon a respective unique, non-telephonic-based recipient computing device identifier associated with each recipient computing device, the method implemented using a centralized server computing device, the method comprising:

storing, in a central data source, a data structure associating a plurality of user identifiers with a plurality of user computing devices and associating each user computing device with a respective unique non-telephonic-based device identifier that uniquely identifies the associated recipient computing device and is used to identify the respective user computing device for communication over a plurality of communication methods;

uploading, to an enterprise communication computing device, an enterprise communication application, wherein execution of the enterprise communication application on the enterprise communication computing device causes the enterprise communication computing device to display a user interface including a plurality of icons, each icon representative of a respective communication interface module of a communication interface of the enterprise communication computing device, each communication interface associated with a respective communication method;

receiving, from the enterprise communication computing device, a query including content of a message to be sent from the enterprise communication computing device;

determining, using artificial intelligence, a plurality of likely intended recipients of the message based upon the content of the message to be sent;

querying the data structure with a plurality of user identifiers respectively associated with the plurality of likely intended recipients, to retrieve the device identifier associated with each of the plurality of user identifiers;

determining, using natural language processing upon the received content of the message, additional information associated with the received content of the message;

transmitting, to the enterprise communication computing device, a response including (i) the retrieved device identifiers, wherein receipt of the response populates a recipient field of the message to be sent with the retrieved device identifiers at the enterprise communication computing device, and (ii) a hyperlink for embedding into the message, the hyperlink configured to, upon execution thereof at one of the recipient computing devices, provide the additional information to a respective user of the recipient computing devices, via one of a webpage or an executed software application on the recipient computing device;

receiving, from the enterprise communication computing device, in response to the enterprise communication computing device transmitting the message, in-real time upon receiving the response including the retrieved device identifiers, to the plurality of user computing devices associated with the retrieved device identifiers, a first reporting message including (i) at least one of the message sent by the enterprise communication computing device and a proxy message including at least a portion of content of the message, and (ii) a list of the plurality of user computing devices to which the message was transmitted; and storing, in the central data source, the first reporting message in a data location indexed according to a device identifier of the enterprise communication computing device.

10. The method of claim 9, further comprising:

receiving, from the enterprise communication computing device, a second reporting message including the list of the plurality of user computing devices and an associated status indicator for the plurality of user computing devices, each status indicator indicating whether the message was delivered to the respective intended recipient associated with each user computing device of the plurality of user computing devices;

querying the central data source using the device identifier of the enterprise communication computing device to retrieve, from the central data source, the first reporting message;

updating the received first reporting message with the status indicators; and storing, in the central data source, the updated first reporting message as an updated reporting message that overwrites the stored first reporting message.

11. The method of claim 9, wherein the storing a data structure comprises:

uploading, to each user computing device, the enterprise communication application;

receiving, upon a first execution of the enterprise communication application at each user computing device, a consent message including indicating user consent from the respective user of the user computing device to transmit and receive messages at the user computing device; and storing, in the data structure, a data element associated with each user computing device that indicates the user computing device is available to transmit and receive message.

12. The method of claim 9, further comprising:

receiving, from the enterprise communication computing device, a request message including the plurality of intended recipients of the message, the request message instructing the centralized server computing device to create a group including the plurality of intended recipients of the message, the request message further including a group identifier associated with the group;

modify the stored data structure to include the group identifier, the data structure storing the group identifier and associating the group identifier with a group of device identifiers including every device identifier respectively associated with each intended recipient of the message; and in response to receiving a query including the group identifier from the enterprise communication computing device, transmitting, to the enterprise communication computing device, a group response including the group of device identifiers, wherein receipt of the group response populates a recipient field of a group message to be sent with the group of device identifiers at the enterprise communication computing device.

13. A method of enabling communication between an enterprise communication computing device and a plurality of recipient computing devices based upon a respective unique, non-telephonic-based recipient computing device identifier associated with each recipient computing device, the method implemented by the enterprise communication computing device including a processor in communication with a memory device and a communication interface, wherein the communication interface includes a plurality of modules including (i) a telephonic communication module for cellular telephonic communication with remote computing devices, (ii) a text-based messaging module for cellular text-based communication with remote computing devices, and (iii) a two-way radio communication module for two-way push-to-talk (PTT) communication with remote computing devices, the method comprising:

generating a user interface for execution on the enterprise communication computing device, the user interface including a display with a plurality of icons, each icon representative of a corresponding module of the plurality of modules;

receiving, from within the user interface executed on the enterprise communication computing device, a user selection of a first icon of the plurality of icons, the first icon representative of a first module of plurality of modules;

executing the first module represented by the selected first icon;

receiving, via the first module executed on the enterprise communication computing device, user input defining a message to be sent using the first module and including a plurality of user identifiers identifying a respective plurality of intended recipients of the message to be sent;

transmitting, to a remote data source, a query including the plurality of user identifiers and a request for validation of the plurality of user identifiers;

receiving, from the remote data source, a subset of a plurality of recipient computing device identifiers of a respective plurality of recipient computing devices, each recipient computing device associated with a respective one of the intended recipients of the message to be sent, wherein each recipient identifier includes a unique non-telephonic-based identifier associated with the respective recipient computing device, wherein the same recipient identifier is used to communicate with the respective recipient computing device using each of the plurality of modules, and wherein only the subset of the plurality of recipient computing device identifiers of a respective subset of the plurality of recipient computing devices associated with respective ones of a validated subset of the plurality of user identifiers are received; and transmitting in real-time, via the first module, the message to the plurality of recipient computing devices identified based upon the received recipient computing device identifiers.

14. The method of claim 13 further comprising:

transmitting, to the remote data source, a first reporting message including (i) at least one of the message and a proxy message including at least a portion of content of the message, and (ii) a list of the plurality of recipient computing devices to which the message was transmitted, wherein receipt of the first reporting message causes the remote data source to store the first reporting message in a data location indexed according to an identifier of the enterprise communication computing device.

15. The method of claim 14 further comprising:

receiving, from at least one recipient computing device to which the message was transmitted, a status message including a status indicator indicating whether the message was delivered to the respective intended recipient associated with the at least one recipient computing device; and transmitting, to the remote data source, a second reporting message including the list of the plurality of recipient computing devices and the associated status indicator for the at least one recipient computing device, wherein receipt of the second reporting message causes the remote data source to retrieve the first reporting message and update the stored first reporting message with the status indicators.

16. The method of claim 13 further comprising:

downloading, from the remote data source, an enterprise communication application, wherein generating the user interface comprises executing the enterprise communication application.

17. The method of claim 16 further comprising:

upon a first time executing the enterprise communication application, receiving user input indicating user consent from a user of the enterprise communication computing device to transmit and receive messages.

18. The method of claim 13, wherein the first icon includes an icon representative of the telephonic communication module, wherein executing the first module comprises executing the telephonic communication module, wherein the message to be sent includes a telephonic communication with the plurality of intended recipients, and wherein transmitting the message to the plurality of recipient computing devices comprises initiating a cellular telephonic communication with each of the plurality of recipient computing devices over a cellular telephone network.

* * * * *